(12) United States Patent
Javadi et al.

(10) Patent No.: US 11,444,889 B2
(45) Date of Patent: *Sep. 13, 2022

(54) FORWARDING ELEMENT DATA PLANE WITH COMPUTING PARAMETER DISTRIBUTOR

(71) Applicant: Barefoot Networks, Inc., Santa Clara, CA (US)

(72) Inventors: Masoud Moshref Javadi, San Jose, CA (US); Changhoon Kim, Palo Alto, CA (US); Patrick W. Bosshart, Plano, TX (US); Anurag Agrawal, Santa Clara, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/255,984

(22) PCT Filed: Mar. 8, 2019

(86) PCT No.: PCT/US2019/021429
§ 371 (c)(1),
(2) Date: Dec. 23, 2020

(87) PCT Pub. No.: WO2020/036633
PCT Pub. Date: Feb. 20, 2020

(65) Prior Publication Data
US 2021/0176194 A1    Jun. 10, 2021

Related U.S. Application Data

(63) Continuation of application No. 16/147,750, filed on Sep. 30, 2018, now Pat. No. 10,721,188, which is a
(Continued)

(51) Int. Cl.
*H04L 12/935* (2013.01)
*H04L 49/00* (2022.01)
(Continued)

(52) U.S. Cl.
CPC ...... *H04L 49/3063* (2013.01); *G06F 9/45558* (2013.01); *G06N 3/08* (2013.01); *G06F 2009/45595* (2013.01)

(58) Field of Classification Search
CPC .... H04N 19/107; H04N 19/13; H04N 19/132; H04N 19/17; H04N 19/174
See application file for complete search history.

(56) References Cited

U.S. PATENT DOCUMENTS 7,899,900 B1    3/2011  Motoyama
8,750,119 B2    6/2014  Lambeth et al.
(Continued)

FOREIGN PATENT DOCUMENTS

WO    2020036633 A1    2/2020

OTHER PUBLICATIONS

Office Action for U.S. Appl. No. 16/945,012, dated Jul. 27, 2021.
(Continued)

*Primary Examiner* — Jamal Javaid
(74) *Attorney, Agent, or Firm* — Essential Patents Group, LLP.; Christopher K. Gagne

(57) ABSTRACT

Some embodiments provide a network forwarding element with a data-plane forwarding circuit that has a parameter collecting circuit to store and distribute parameter values computed by several machines in a network. In some embodiments, the machines perform distributed computing operations, and the parameter values that compute are parameter values associated with the distributed computing operations. The parameter collecting circuit of the data-plane forwarding circuit (data plane) in some embodiments
(Continued)

(1) stores a set of parameter values computed and sent by a first set of machines, and (2) distributes the collected parameter values to a second set of machines once it has collected the set of parameter values from all the machines in the first set. The first and second sets of machines are the same set of machines in some embodiments, while they are different sets of machines (e.g., one set has at least one machine that is not in the other set) in other embodiments. In some embodiments, the parameter collecting circuit performs computations on the parameter values that it collects and distributes the result of the computations once it has processed all the parameter values distributed by the first set of machines. The computations are aggregating operations (e.g., adding, averaging, etc.) that combine corresponding subset of parameter values distributed by the first set of machines.

25 Claims, 12 Drawing Sheets

Related U.S. Application Data continuation of application No. 16/147,754, filed on Sep. 30, 2018, now Pat. No. 10,771,401, and a continuation of application No. 16/147,755, filed on Sep. 30, 2018, now Pat. No. 10,986,042.

(60) Provisional application No. 62/733,441, filed on Sep. 19, 2018, provisional application No. 62/718,373, filed on Aug. 13, 2018.

(51) Int. Cl.
*G06F 9/455* (2018.01)
*G06N 3/08* (2006.01)

(56) References Cited

U.S. PATENT DOCUMENTS

| | | | |
|---|---|---|---|
| 10,579,937 B2 | 3/2020 | Brand et al. | |
| 10,721,188 B2 * | 7/2020 | Javadi | G06F 9/45558 |
| 16,945,012 | 7/2020 | Javadi | |
| 2006/0092976 A1 | 5/2006 | Lakshman et al. | |
| 2009/0154334 A1 | 6/2009 | Lee et al. | |
| 2010/0128726 A1 | 5/2010 | Takakuwa | |
| 2012/0069752 A1 | 3/2012 | Larocque et al. | |
| 2013/0058340 A1 | 3/2013 | Lambeth et al. | |
| 2013/0138589 A1 | 5/2013 | Yu et al. | |
| 2014/0244966 A1 | 8/2014 | Bosshart et al. | |
| 2017/0093986 A1 | 3/2017 | Kim et al. | |
| 2018/0322607 A1 | 11/2018 | Mellempudi et al. | |
| 2019/0073581 A1 | 3/2019 | Chen et al. | |
| 2020/0053027 A1 | 2/2020 | Javadi et al. | |
| 2020/0053028 A1 | 2/2020 | Javadi et al. | |
| 2020/0053029 A1 | 2/2020 | Javadi et al. | |

OTHER PUBLICATIONS

International Preliminary Report on Patentability for PCT Application No. PCT/US2019/021429, dated Feb. 16, 2021.
Notice of Allowance for U.S. Appl. No. 16/147,750, dated Mar. 11, 2020.
Notice of Allowance for U.S. Appl. No. 16/147,754, dated Apr. 22, 2020.
Notice of Allowance for U.S. Appl. No. 16/147,755, dated Dec. 15, 2020.
Office Action for U.S. Appl. No. 16/147,750, dated Oct. 9, 2019.
Office Action for U.S. Appl. No. 16/147,754, dated Oct. 22, 2019.
Office Action for U.S. Appl. No. 16/147,755, dated Apr. 23, 2020.
Office Action for U.S. Appl. No. 16/147,755, dated Oct. 23, 2019.
Lou, L. et al., "Parameter Hub: High Performance Parameter Servers for Efficient Distributed Deep Neural Network Training", Jan. 30, 2018, 3 pages, arXiv:1801.09805v1, Cornell University, Ithaca, NY, USA.
International Search Report and Written Opinion for PCT Patent Application No. PCT/US19/21429, dated May 23, 2019, 9 pages.
Yang et al. "Forwarding and control element separation {ForCES} framework ", Network Working Group, Apr. 2004 (Apr. 2004) Retrieved on May 4, 2019 (May 4, 2019), 41 pages.
Office Action for U.S. Appl. No. 16/945,012, dated Jan. 14, 2022.
Office Action for U.S. Appl. No. 16/945,012 dated Apr. 25, 2022.
Extended European Search Report for European Patent Application No. 19849425.4, dated Apr. 4, 2022.
Siracusano, G., et al. , "In-network Neural Networks", Arxiv.org, Cornell University Library, Jan. 17, 2018.
Tanomoto, M., et al., "A CGRA-based Approach for Accelerating Convolutional Neural Networks", 2015 IEEE 9th International Symposium on Embedded Multicore/Many-core Systems-on-Chip, Sep. 23, 2015.

* cited by examiner

Figure 3

Storage Index Location U

| | Stage 0 | Stage 1 | Stage 2 | Stage 3 | Stage 4 | Stage 5 | Stage 6 | Stage 7 | Stage 8 | Stage 9 | Stage 10 | Stage 11 |
|---|---|---|---|---|---|---|---|---|---|---|---|---|
| | a0b0 | a4b4 | c0d0 | c4d4 | | | | | | | k0l0 | k4l4 |
| | a1b1 | a5b5 | c1d1 | c5d5 | | | | | | | k1l1 | k5l5 |
| | a2b2 | a6b6 | c2d2 | c6d6 | | | | | | | k2l2 | k6l6 |
| | a3b3 | a7b7 | c3d3 | c7d7 | | | | | | | k3l3 | k7l7 |

Figure 4

Storage Index Location X

| | Stage 0 | Stage 1 | Stage 2 | Stage 3 | Stage 4 | Stage 5 | Stage 6 | Stage 7 | Stage 8 | Stage 9 | Stage 10 | Stage 11 |
|---|---|---|---|---|---|---|---|---|---|---|---|---|
| | c8d8 | c12d12 | e8f8 | e12f12 | | | | | | | a8b8 | a12b12 |
| | c9d9 | c13d13 | e9f9 | e13f13 | | | | | | | a9b9 | a13b13 |
| | c10d10 | c14d14 | e10f10 | e14f14 | | | | | | | a10b10 | a14b14 |
| | c11d11 | c15d15 | e11f11 | e15f15 | | | | | | | a11b11 | a15b15 |

Figure 5

Storage Index Location Y

| Stage 0 | Stage 1 | Stage 2 | Stage 3 | Stage 4 | Stage 5 | Stage 6 | Stage 7 | Stage 8 | Stage 9 | Stage 10 | Stage 11 |
|---|---|---|---|---|---|---|---|---|---|---|---|
| e16f16 | e20f20 | | | | | | | a16b16 | a20b20 | c16d16 | c20d20 |
| e17f17 | e21f21 | | | | | | | a17b17 | a21b21 | c17d17 | c21d21 |
| e18f18 | e22f22 | | | | | | | a18b18 | a22b22 | c18d18 | c22d22 |
| e19f19 | e23f23 | | | | | | | a19b19 | a23b23 | c19d19 | c23d23 |

Figure 6

Storage Index Location Z

| Stage 0 | Stage 1 | Stage 2 | Stage 3 | Stage 4 | Stage 5 | Stage 6 | Stage 7 | Stage 8 | Stage 9 | Stage 10 | Stage 11 |
|---|---|---|---|---|---|---|---|---|---|---|---|
| | | | | | | a24b24 | a28b28 | c24d24 | c28d28 | e24f24 | e28f28 |
| | | | | | | a25b25 | a29b29 | c25d25 | c29d29 | e25f25 | e29f29 |
| | | | | | | a26b26 | a30b30 | c26d26 | c30d30 | e26f26 | e30f30 |
| | | | | | | a27b27 | a31b31 | c27d27 | c31d31 | e27f27 | e31f31 |

FORWARDING ELEMENT DATA PLANE WITH COMPUTING PARAMETER DISTRIBUTOR

CLAIM OF PRIORITY

This application is a U.S. National Phase Application under 35 U.S.C. § 371 of International Application No. PCT/US2019/021429 filed Mar. 8, 2019, which is based on U.S. application Ser. No. 16/147,750 filed Sep. 30, 2018, and U.S. application Ser. No. 16/147,754 filed Sep. 30, 2018, and U.S. application Ser. No. 16/147,755 filed Sep. 30, 2018, all of which claim the benefit of U.S. Provisional Application No. 62/733,441 filed Sep. 19, 2018, and U.S. Provisional Application No. 62/718,373 filed Aug. 13, 2018 the entire contents of which are incorporated herein by reference.

BACKGROUND

In recent years, many network operations have migrated to data compute servers that execute virtual machines or containers, as these servers have extra computational resources and can handle some amount of network operations. At the same time, however, the processing power of network forwarding elements has dramatically increased and this processing power often remains untapped in many common network deployments. In addition, the packet processing line rates of some of the fastest network forwarding elements are dramatically higher than the computational powers of the data compute servers. Accordingly, it would be beneficial to use the packet processing data plane pipelines of the network forwarding elements to absorb some of the data compute operations from the data compute servers, so that these operations can be performed in the network at dramatically faster rates.

BRIEF SUMMARY

Some embodiments of the invention provide a data-plane forwarding circuit (data plane) that has a parameter collecting circuit that stores parameter values sent by a first set of machines in a network and distributes the parameter values to a second set of machines in the network. The first and second sets of machines are the same set of machines in some embodiments, while they are different sets of machines (e.g., one set has at least one machine that is not in the other set) in other embodiments. The machines in some embodiments are virtual machines (VMs), containers, or standalone computers/servers. Also, in some embodiments, the machines perform distributed computing operations, and the parameter values that are distributed by the first machine set and the data plane are parameter values associated with the distributed computing operations.

To perform its forwarding operations, the data plane includes several data message processing stages that are configured to process the data tuples associated with the data messages received by the data plane. In some embodiments, the data plane's message-processing stages are organized into several ingress message-processing stages and egress message-processing stages, which are communicatively linked through a crossbar switch, called a traffic manager. In some embodiments, parts of the data plane message-processing stages are also configured to implement the parameter collecting circuit. In other embodiments, the data plane has a dedicated parameter collecting circuit that does not use re-purposed message processing stages for parameter distribution operations.

The operations of the data plane's message processing stages are configured by a local or remote control plane in some embodiments. In some embodiments, a local control plane is implemented by a control software layer that is executed by one or more general purpose processors (e.g., CPUs) of the forwarding element, while a remote control plane is implemented by a control software layer executed by one or more CPUs of another forwarding element or a remote computer (e.g., server).

In some embodiments, the parameter collecting circuit of the data plane includes a parameter extracting circuit to extract, from a subset of the data messages, parameter values computed and distributed by the first set of machines. The parameter values in some embodiments are stored as key-value pairs in the headers of the subset of the data messages that the data plane receives from the first set of machines. For instance, in some embodiments, the header of each data message from a first-set machine includes (1) a layer 4 port (e.g., UDP source port) value that specifies that the data message contains a key-value pair and (2) an option field that stores the key (i.e., the parameter) and its value. In other embodiments, the layer-4 option field only includes key values (and not the keys) as the key values are specified in a particular order that can be used to associated different values stored in the header with different keys. Still other embodiments use other techniques to store and retrieve the parameter values in the payloads and/or headers of the data messages from the first-set machines.

The parameter collecting circuit includes a set of one or more storages in which the parameter extracting circuit stores the extracted parameter values. The collecting circuit also includes a parameter forwarding circuit to retrieve the stored parameter values and to forward the retrieved parameter values to the second set of machines. The parameter forwarding circuit in some embodiments retrieves and forwards the stored parameter values after all the parameter values that are distributed by all of the machines in the first set have been stored in the set of storages. In other embodiments, the parameter forwarding circuit retrieves and forwards the stored parameter values to the second set of machines based on other criteria (e.g., after a duration of a time measured by a timer).

In some embodiments, the parameter forwarding circuit includes a data message generator that generates several data messages to store the retrieved parameter values to forward to the second-set machines. The data message generator in some embodiments generates data messages by replicating a last data message that provides a last set of one or more parameter values to complete a group of parameter values collected from the first machine. In some embodiments, the data message generator is implemented by the data plane traffic manager, which forwards data messages from the data plane's ingress message-processing pipelines to its egress message-processing pipelines.

The traffic manager in some embodiments includes a mirror buffer that includes the set of storages that store the parameter values contained in the data messages sent by the first-set machines. In some embodiments, the data plane (e.g., a message processing stage of an ingress processing pipeline or an egress processing pipeline) implements a bit map generator that generates a bit map to keep track of different parameter value sets received from different first-set machines. When the bit map indicates that all the parameter-value sets from all the first-set machines have been received, the traffic manager's data message generator retrieves the stored parameter values from the mirror buffer, generates one or more messages for each second-set machine, embeds the retrieved stored parameter values in each of the generated messages, and provides the generated data messages to one or more egress pipelines for forwarding to the second-set machines. In some embodiments, the generated messages have to be recirculated back to the ingress pipelines to identify the egress pipelines that are supposed to process each message for each second-set machine.

Instead of using a mirror buffer in the traffic manager to store the parameter values from the first-set machines, the data plane circuit in some embodiments uses stateful storages of stateful processing units in the data plane to store these values. Specifically, in some embodiments, at least a set of message-processing stages include stateful processing units (e.g., stateful arithmetic logic units, ALUs) and stateful storages (e.g., stateful registers or tables) for these processing units.

The data plane in some embodiments has a parser that extracts a header from a received data message, and formats this header as a header vector (HV) for processing by the data-plane message processing stages. Header vectors can be modified by successive message processing stages as part of their message processing operations. When processing a header vector for a data message from a first-set machine, a message processing stage can determine that the header vector contains one or more parameter values from a first-set machine (e.g., by matching one or more header vector attributes with match rules stored in the message processing stage). Based on this determination, the processing stage can direct its stateful processing unit to store one or more parameter values in its stateful storage, and/or mark the header vector so that one or more subsequent stateful processing units of one or more subsequent message processing stages can store the parameter values in their stateful storages.

In some embodiments, the stateful processing units and storages that are used to implement the parameter collecting circuit are all part of one or more ingress pipelines. In other embodiments, the parameter collecting circuit is implemented by stateful processing units and storages of both the ingress and egress pipelines. In still other embodiments, the stateful processing units and storages that are used to implement the parameter collecting circuit are all part of one or more egress pipelines. In some of the embodiments in which the stateful processing units and storages are in one or more egress pipelines, one or more ingress pipelines are used to shift the parameter values in the header vectors to facilitate interleaving the storage of these parameter values.

In some embodiments, each machine in the first machine set distributes a set of several parameter values, with each parameter value in each machine's distributed parameter-value set having an associated parameter value in each other parameter value set distributed by each other machine in the first set. For example, in some embodiments, the first set includes four machines 1-4, and each machine distributes three values for three parameters A-C. In this example, the four values (A1, A2, A3, and A4 from machines 1, 2, 3, and 4) for parameter A are associated as they are values for the same parameter, the four values for parameter B (B1, B2, B3, and B4 from machines 1, 2, 3, and 4) are associated as they are values for the same parameter, and the four values for parameter C (C1, C2, C3, and C4 from machines 1, 2, 3, and 4) are associated as they are values for the same parameter.

In some embodiments, the parameter forwarding circuit of the data plane's parameter collecting circuit sends the stored parameter values (i.e., the values stored in the data plane) in an interleaved manner that places next to each other sets of associated values collected from different machines. For instance, for the above-described example, the parameter forwarding circuit in some embodiments sends a message to each of the machines 1-4 with all the parameter A values next to each other, all the parameter B values next to each other, and all the parameter C values next to each other (e.g., the message would contain: A1, A2, A3, A4, B1, B2, B3, B4, C1, C2, C3, C4).

To help with output interleaving, the parameter extracting circuit in some embodiments interleaves the storages of the parameter values distributed by each machine so that sets of associated parameter values are stored in the same storage locations, adjacent storage locations, and/or similarly addressed storage locations. For instance, the parameter extracting circuit in some of these embodiments uses an interleaved storage pattern to store parameter values of different machines in order to simplify interleaving the output of these parameter values. In some embodiments, the parameter extracting circuit also shifts some of the parameter values in the header vectors to facilitate the interleaved storage of the parameter values (e.g., shifts parameter values from machine 1 so that they can be stored next to their related values from machine 2).

The parameter extracting circuit in some embodiments rotates its interleaved storage of parameter values for different subsets of machines in order to ensure that the desired sets of associated parameters values are stored near each other or in a set of associated or related storage locations. One example of rotated storage patterns would be storing first-parameter values of machines 1 and 2 in an earlier first stateful storage, while storing first-parameter values of machines 3 and 4 in a later second stateful storage, but then storing second-parameter values of machines 1 and 2 in the later second stateful storage, while storing second-parameter values of machines 3 and 4 in the earlier first stateful storage.

In some embodiments, the parameter collecting circuit performs computations on the parameter values that it collects and distributes the result of the computations once it has processed all the parameter values distributed by the first set of machines. The computations are aggregating operations (e.g., adding, averaging, etc.) that combine corresponding subsets of parameter values distributed by the first set of machines. For instance, in some embodiments, each first-set machine distributes four multi-bit parameter values A, B, C, and D, each of which corresponds to one parameter value distributed by each of the other first-set machines. In some of these embodiments, the parameter collecting circuit adds all the A's, B's, C's, and D's, and then distributes to the second-set machines the resulting sum once it has added the last set of parameter values A-D that it receives from the last first-set machine.

For instance, in some embodiments, the data plane is configured to collect and aggregate sets of weight gradients from several machines that process known input/output training sets to train the weights of a neural network. In some of these embodiments, the data plane adds the different weight gradients that it collects from the ML machines 105 for each of the several weights, and then distributes to the machines the aggregated weight gradients for each of these weights. To perform its aggregation operations, the data plane converts floating-point weight gradients that it receives from the machines to fixed-point weight-gradients that it aggregates, and then converts the aggregated fixed-point values back to aggregated floating-point weight gradients that it distributes back to the ML machines.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF FIGURES

The novel features of the invention are set forth in the appended claims. However, for purposes of explanation, several embodiments of the invention are set forth in the following figures.

FIGS. 3-6 illustrates four SALU storage locations (e.g., four SALU registers) in four SALU tables (e.g., four register sets) that are identified by the same address value (e.g., by the same hash index value that is generated by hashing a set of header vector values).

FIG. 7 illustrates the sequence of weight gradients that are included in the four data messages that the parameter collecting circuit sends to each ML machine in some embodiments.

DETAILED DESCRIPTION

Figure 1:
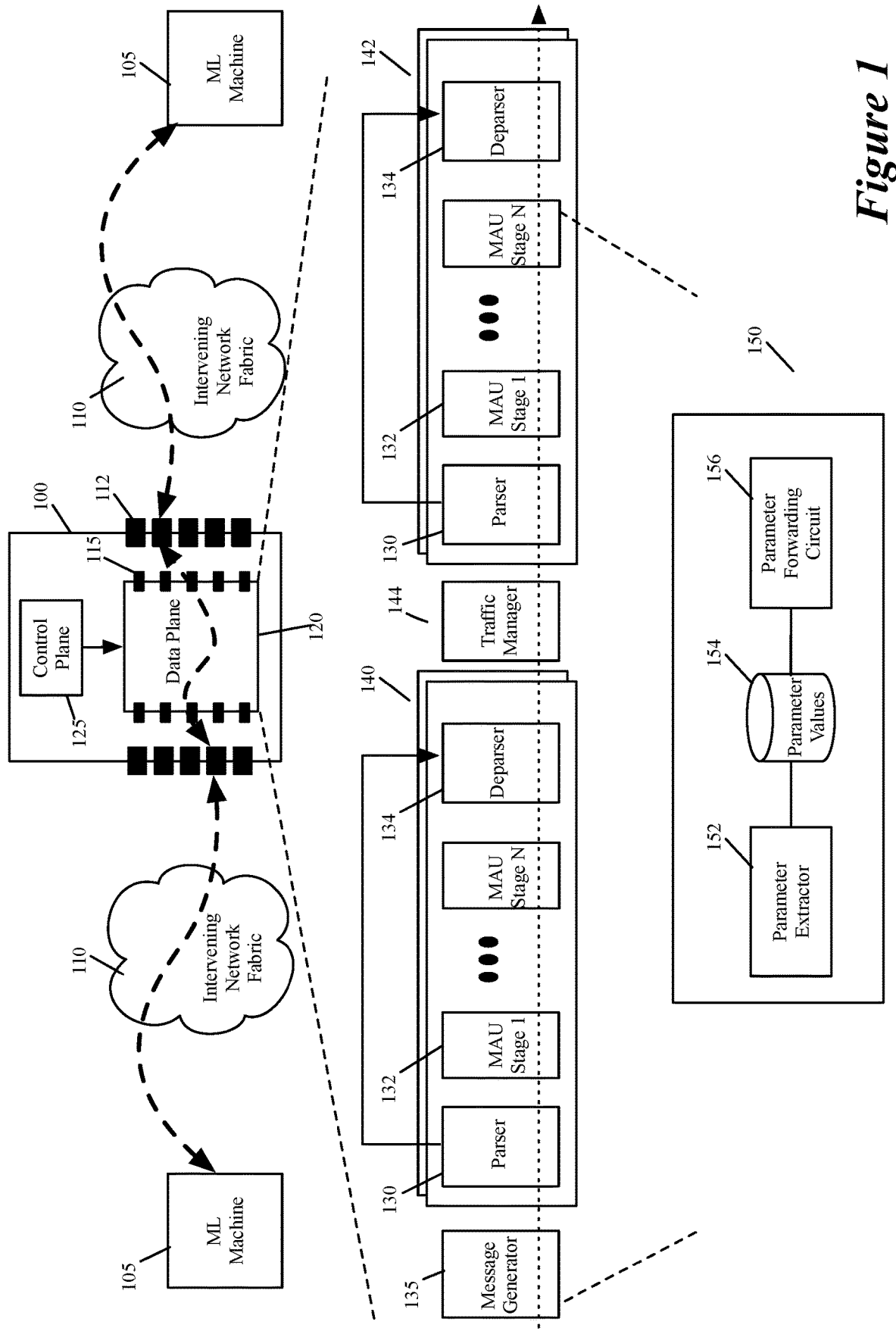
FIG. 1 illustrates an example of a forwarding element with a data plane circuit that can be configured to implement an all-gather parameter collecting circuit of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a network forwarding element with a data-plane forwarding circuit that has a parameter collecting circuit to store and distribute parameter values computed by several machines in a network. In some embodiments, the machines perform distributed computing operations, and the parameter values that compute are parameter values associated with the distributed computing operations. The parameter collecting circuit of the data-plane forwarding circuit (data plane) in some embodiments (1) stores a set of parameter values computed and sent by a first set of machines, and (2) distributes the collected parameter values to a second set of machines once it has collected the set of parameter values from all the machines in the first set. The first and second sets of machines are the same set of machines in some embodiments, while they are different sets of machines (e.g., one set has at least one machine that is not in the other set) in other embodiments.

In some embodiments, the parameter collecting circuit performs computations on the parameter values that it collects and distributes the result of the computations once it has processed all the parameter values distributed by the first set of machines. The computations are aggregating operations (e.g., adding, averaging, etc.) that combine corresponding subset of parameter values distributed by the first set of machines. For instance, in some embodiments, each first-set machine distributes four multi-bit parameter values A, B, C, and D, each of which corresponds to one parameter value distributed by each of the other first-set machines. In some of these embodiments, the parameter collecting circuit adds all the A's, B's, C's and D's, and then distributes to the second-set machines the resulting sum once it has added the last set of parameter values A-D that it receives from the last first-set machine.

In the discussion below, "all reduce" refers to the parameter collecting circuit embodiments that perform aggregating computations on the collected parameter values to reduce these values to one set of aggregate parameter values that these embodiments distribute to the second-set machines. On the other hand, the discussion uses "all gather" to refer to the parameter collecting circuit embodiments that just collect and distribute the parameter values sent by the first-set machines. Several of the "all reduce" and "all gather" examples provided below are for machine-training learning processes of some embodiments. One of ordinary skill will realize that other embodiments use the "all reduce" and "all gather" operations of the data plane for other distributed computing applications.

In this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

FIG. 1 illustrates an example of a forwarding element 100 with a data plane circuit 120 that can be configured to implement an all-gather parameter collecting circuit 150. This parameter collecting circuit stores parameter values computed and sent by several machines 105, and then distributes the collected parameter values to the same machines once it has collected the parameter values from all the machines. The machines in some embodiments are virtual machines (VMs), containers, and/or standalone computers/servers.

Different embodiments use the parameter collecting circuit 150 to collect different types of parameter values for different distributed computing applications. In the example illustrated in FIG. 1 as well as other figures, the parameter values are weight value gradients associated with machine-learning operations. In other embodiments, the collected parameter values are other types of parameter values.

In FIG. 1, the machines 105 perform machine-learning (ML) training processes that produce weight value gradients that need to be shared between the machines. Specifically, the machines 105 process inputs/outputs training sets to train the weight values of a neural network with different machines processing different batches of known input/output training sets and performing back propagation operations to adjust weight values of the neural network. In this environment, the machines need to share weight value gradients that they compute for edges between the neurons in the neural network. Accordingly, once they compute a set of weight value gradients, the machines 105 embed these gradients in data messages (e.g., embed them in UDP headers of packets) and transmit these data messages (e.g., the packets) through a network 110 that connects the machines 105.

The forwarding element 100 forwards data messages within the network 110. The forwarding element 100 can be any type of forwarding element, such as a switch, a router, a bridge, etc. In FIG. 1, the forwarding element is deployed as a non-edge forwarding element in the interior of the network to forward data messages between the machines 105. In other cases, the forwarding element 100 is deployed as an edge forwarding element at the edge of the network to connect to compute devices (e.g., standalone or host computers) that serve as sources and destinations of the data messages. As a non-edge forwarding element, the forwarding element 100 forwards data messages between forwarding elements in the network (i.e., through intervening network fabric 110). As an edge forwarding element, the forwarding element forwards data messages to and from edge compute devices to each other, to other edge forwarding elements, and/or to non-edge forwarding elements.

As shown, the forwarding element 100 includes (1) a data plane circuit 120 (the "data plane 120") that performs the forwarding operations of the forwarding element 100 to forward data messages received by the forwarding element to other devices, and (2) a control plane circuit 125 (the "control plane 125") that configures the data plane circuit. The forwarding element 100 also includes physical ports 112 that receive data messages from, and transmit data messages to, devices outside of the forwarding element 100.

The control plane 125 configures the data plane 120 to perform its message forwarding and parameter collection operations. In some embodiments, the control plane includes (1) one or more processors (such as a microprocessor with multiple processing cores or units) that execute instructions, and (2) a memory that stores instructions for processes that when executed by the processors perform the control plane operations. These instructions can be specified by (1) a manufacturer of the network forwarding element 100 that includes the control and data planes 125 and 120, (2) a network administrator that deploys and maintains the network forwarding 100, or (3) one or more automated processes that execute on servers and/or network forwarding elements that monitor network conditions. The control plane processor, or another circuit of the control plane, communicates with the data plane (e.g., to configure the data plane or to receive statistics from the data plane) through a control/data plane interface.

The data plane circuit 120 includes ports 115 that receive data messages to process and transmit data messages after they have been processed. Some ports 115 of the data plane 120 are associated with the physical ports 112 of the forwarding element 100, while other ports 115 are associated with other modules of the data plane 120. For instance, in some embodiments, one or more ports 115 are recirculation ports that recirculate a data message that is processed by an egress pipeline 142 back to an ingress pipeline 140. The data plane 120 also includes message generators 135, multiple ingress pipeline stages 140, multiple egress pipeline stages 142, and a traffic manager 144. In some embodiments, the data plane is implemented on an application specific integrated circuit (ASIC), and its components are defined on this integrated circuit.

The message generators generate messages in the data plane. In some embodiments, these messages can direct circuits in the data plane to perform certain operations or to store data in the messages for export to the control plane or to another device through a network. The ingress and egress pipelines process the data messages received by the forwarding element in order to forward these messages to their destinations in the network. The traffic manager 144 in some embodiments includes a crossbar switch that directs messages from the ingress pipelines to egress pipelines.

Each ingress or egress pipeline includes several configurable (i.e., programmable) message-processing stages 132 that can be configured to perform the data-plane forwarding operations of the forwarding element 100 to process and forward data messages to their destinations. These message-processing stages perform these forwarding operations by processing data tuples (e.g., message headers) associated with data messages received by the data plane 120 in order to determine how to forward the messages.

The message processing stages in this example are match-action units (MAUs) 132. As further described below by reference to FIG. 9, an MAU is a circuit in some embodiments that includes match tables that store multiple records for matching with data tuples (e.g., header vectors) of the processed data messages. When a data message matches a match record, the MAU then performs an action specified by an action record associated with the identified match record (e.g., an action record that is identified by the identified match record).

In some embodiments, an MAU also includes a set of stateful ALUs (e.g., four ALUs) that perform arithmetic operations based on parameters specified by the header vectors and/or the match tables. The ALUs can store the result of their operations in stateful tables that they access and/or can write these results in the header vectors (e.g., directly, or by directing another action ALU to write these results in the header vectors) for other MAU stages to process.

In addition to the MAU stages, each ingress or egress pipeline includes a parser 130 and a deparser 134. A pipeline's parser 130 extracts a message header from a data message that the pipeline receives for processing. In some embodiments, the extracted header is in a format of a header vector (HV) that is processed, and in some cases modified, by successive message processing stages 132 as part of their message processing operations. The parser 130 of a pipeline passes the payload of the message to the deparser 134 as the pipeline's message-processing stages 132 operate on the header vectors. In some embodiments, the parser also passes the message header to the deparser 134 along with the payload (i.e., the parser passes the entire message to the deparser).

When a pipeline finishes processing a data message and the message has to be provided to the traffic manager (in case of an ingress pipeline) or to a port 115 (in case of an egress pipeline) to be forwarded to the message's next hop (e.g., to its destination compute node or next forwarding element), a deparser 134 of the pipeline in some embodiments produces the data message header from the message's header vector that was processed by the pipeline's last message processing stage, and combines this header with the data message's payload. In some embodiments, the deparser 134 uses part of the header received form the parser 130 to reconstitute the message from its associated header vector.

As shown in FIG. 1, parts of the data plane message-processing stages in some embodiments are also configured to implement the parameter collecting circuit 150. As mentioned above, the local control plane 125 in some embodiments configures the data plane 120 to perform its message forwarding and parameter collection operations. In other embodiments, a remote control plane configures the data plane 120 to implement its forwarding circuits and/or parameter-collection circuits. A remote control plane is implemented in some embodiments by a control software layer executed by one or more CPUs of another forwarding element or a remote computer (e.g., server).

In some embodiments, the parameter collecting circuit 150 circuit examines each data message received by the data plane to determine whether the data message comes from one of the machines 105. If not, this circuit does not process the data message; the message is just processed by the message processing stages 132 of the data plane and forwarded to its destination. On the other hand, when the data message originated from an ML machine 105, the parameter collecting circuit 150 extracts several weight gradients (e.g., 32 gradients) from the data message header and stores these values in the stateful ALUs (SALUs) of several MAU stages 132. Once the parameter collecting circuit 150 has stored the weight gradients in a particular set of weight gradients from all the machines 105, the parameter collecting circuit in some embodiments distributes all the collected weight gradients to the machines 105. In other embodiments, the parameter collecting circuit retrieves and forwards the stored parameter values to the machines 105 based on other criteria (e.g., after a duration of a time measured by a timer).

The parameter values in some embodiments are stored as key-value pairs in the headers of the data messages that the data plane receives from the first set of machines (e.g., the ML machines). For instance, in some embodiments, the header of each data message from a first-set machine includes (1) a layer 4 port (e.g., UDP source port) value that specifies that the data message contains a key-value pair, and (2) an option field that stores the key (i.e., the parameter) and its value. In other embodiments, the layer-4 option field only includes key values (and not the keys) as the key values are specified in a particular order that can be used to associated different values stored in the header with different keys.

Still other embodiments use other techniques to store and retrieve the parameter values in the payloads and/or headers of the data messages from the first-set machines. For instance, in some embodiments, an IPS (in-network parameter server) header is placed after a UDP header, and this IPS header is followed by the weight gradients, as indicated by the example below.

Ethernet, IP, UDP, IPS header, Weight 0, Weight 1, . . . .
The IPS header has two fields in some embodiments: a memory index to show where in data plane to put the parameter values and an identifier to identify the location of a set of weight (associated with the received weight gradients) in the total number of weights of the neural network.

In other embodiments, the IPS header is placed after the Ethernet header, such as Ethernet, IPS header, Weight 0, Weight 1, . . . .
This is useful when the ML machines are specialty ML cards as opposed to servers with GPUs. For such specialty machines, it is not desirable to waste bandwidth for IP and UDP headers as only the Ethernet header is necessary for exchanging messages between the ML cards and the forwarding element.

FIG. 1 conceptually illustrates that the parameter collecting circuit 150 includes a parameter extractor 152, a parameter storage 154, and a parameter forwarding circuit 156. The parameter extractor 152 extracts weight gradients from messages sent by the ML machines 105, and stores these extracted weight gradients in the parameter storage 154. Once all the weight gradients in a set of weight gradients are collected from all the ML machines 105, the parameter forwarding circuit 156 retrieves all the stored weight gradients and forwards them in one or more messages back to all of the ML machines 105.

In some embodiments, the parameter extractor 152 and the parameter storage 154 are implemented by multiple MAU stages 132. Specifically, as mentioned above, the data plane parser 130 extracts a header from a received data message, and formats this header as a header vector (HV) for processing by the data-plane message processing stages 132. Header vectors can be modified by successive message processing stages as part of their message processing operations (e.g., forwarding operations and/or parameter-collection operations).

When processing a header vector for a data message from an ML machine 105, an initial MAU stage in an ingress pipeline in some embodiment identifies that the data message has originated from one of the ML machines (e.g., by matching one or more source network address values in the header vector with match rules stored in a match table of the MAU stage). This MAU stage then has its action ALU mark the header vector to indicate that it contains weight gradients from an ML machine. In order to pack the storage of the weight gradients, this MAU stage in some embodiments also has its action ALU perform a shift operation to shift the weight gradients from certain ML machines, as further described below. In other embodiments, one or more other MAU stages in the ingress pipeline perform this shifting operation.

At the end of the ingress pipeline, the header vector of this message is combined with the message payload, and the combined message is provided to the traffic manager (TM). Based on the designation of the message as one that contains weight gradients, the traffic manager 144 in some embodiments places the message in a TM egress queue (not shown)

that is associated with the egress pipeline 142 designated for processing a particular weight gradient set distributed by the ML machines.

From this TM egress queue, the data message passes to its corresponding egress pipeline 142, which has its parser 130 separate the message into its payload and header vector, pass the payload (or entire message) along a bypass path to the deparser 134 of the pipeline and pass the header vector to the first MAU stage 132 of the pipeline. In some embodiments, the SALUs and stateful tables of this egress processing pipeline form the parameter extractor circuit 152 and the parameter storage 154. For instance, in some embodiments, an egress pipeline has twelve MAU stages, each of which has four SALUs that can store two 16-bit weight gradients in four SALU tables. This allows each egress pipeline to collect 32 16-bit weight gradients from 12 ML machines 105.

Under this approach, whenever the message's header vector reaches one of these egress MAUs 132, a match table of the MAU determines that the header vector contains several weight gradients that need to be extracted and directs its associated SALUs to extract the weight gradients. The SALUs then extract the weight gradients and store these gradients in the ALUs' associated stateful tables. For instance, as further described below, each egress SALU in some embodiments stores two 16-bit gradients from two different ML machines 105 in each 32-bit stateful table record (e.g., in each 32-bit SALU register).

In some embodiments, one ingress or egress MAU stage maintains a bitmap (e.g., in the MAU's SALU) that has one bit for each ML machine that has sent its set of weight gradients. Each time this MAU stage determines that a header vector that it processes corresponds to a data message from one of the ML machines, it changes the bit value for this ML machine in its bitmap to set (e.g., changes this value from 0 to 1). Once all the bits in the bitmap have been set, this MAU stage determines that all the weight gradient sets have been received from all the ML machines. Hence, in these embodiments, this MAU stage sets a value in the header vector to indicate that this header vector finished the collection of related weight gradient sets from all of the ML machines. This MAU stage partly implements the parameter forwarding circuit 156 in some embodiments. Instead of a bitmap, the data plane in other embodiments uses other schemes (e.g., a counter) to determine when the data plane has weight gradient sets from all the ML machines.

Figure 2:
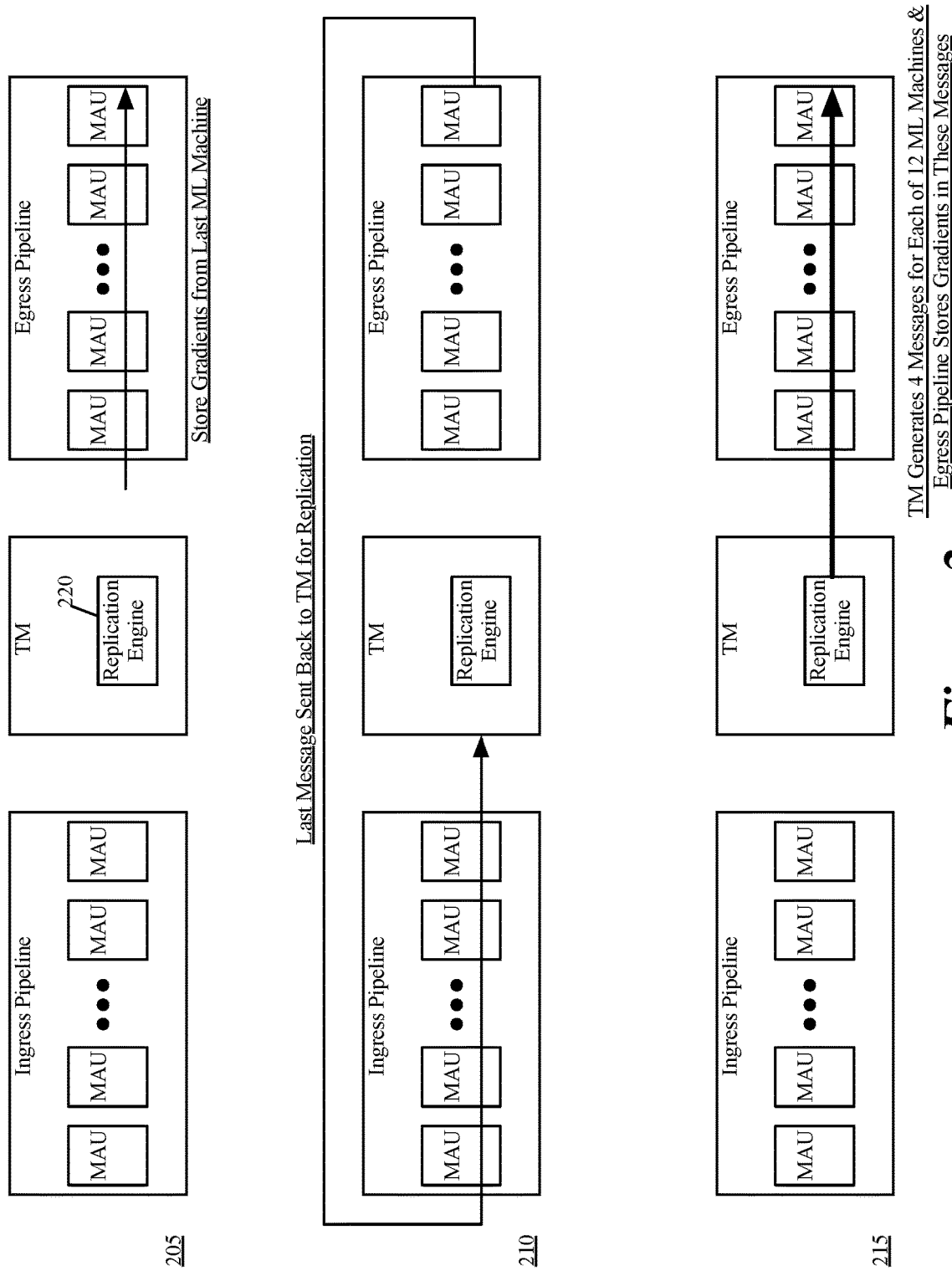
FIG. 2 illustrates an example of a replication process of some embodiments that generates several replicate data messages in which the extracted and stored weight gradient sets can be embedded and distributed to the ML machines.

Once the header vector is marked as being the header vector that provides the last weight gradient set from the last ML machine, the data plane 120 in some embodiments uses that header vector to generate several replicate data messages in which the extracted and stored weight gradient sets can be embedded and distributed to the ML machines. FIG. 2 illustrates an example of this operation in some embodiments. Specifically, it illustrates three stages of operations 205, 210, and 215. The first stage of operations 205 shows the processing of a header vector to store in the egress MAU stages a last set of weight gradients that completes the collection of a group of several sets of weight gradients from several ML machines (e.g., twelve sets of 32 weight gradients 0-31 from twelve ML machines A-L).

The second stage of operations 210 shows the conversion of this header vector back to a data message that is fed back through an ingress pipeline 140 to the traffic manager 144. In this stage, the ingress pipeline converts the data message back to a header vector and marks the header vector for replication based on its marking as the last header vector by the bitmap generating MAU. This header vector is converted to a data message that is then supplied to the traffic manager 144.

In the third stage of operations 215, the traffic manager 144 then detects the replication marking, and based on this marking, has its replication engine 220 generate several replicated copies (e.g., 47) of this message. These copies plus the original data message are then converted to header vectors that are processed by the egress pipeline that stores the completed group of weight gradients. The MAUs in this egress pipeline then retrieve different sub-groups of weight gradients and store these retrieved sub-groups in different header vectors. In some embodiments, each replica stores the same sub-group of weight gradients as several other (e.g., 11) replicas but is addressed to a different ML machine (e.g., it is addressed to one of 12 ML machines).

For instance, in some embodiments with 12 ML machines that produce 32 weight gradients each, there are 384 weight gradients that need to be distributed to each ML machine. In some of these embodiments, each data message can carry at most only 96 gradients, so four data messages are used to supply the 384 gradients to each ML machine. Four messages for each of the twelve clients requires 47 replicas to be generated by the TM 144 in addition to the last recirculated data message. The TM 144 in some embodiments identifies the destination addresses of each of the replicated/recirculated data message based on configuration data that it receives to program its operations. In other embodiments, the ingress pipeline that processes the recirculated data message in the second stage 210 specifies the destination addresses for the twelve sets of four data messages. In the above example, the parameter forwarding circuit 156 is implemented by the bitmap generating MAU, the data plane circuits that recirculate the final data message back to an ingress pipeline, this ingress pipeline that marks the recirculated message for replication, the TM that replicates the recirculated message, and the egress MAU stages that retrieve the different sub-groups of weight gradients from their SALU tables and store them in the header vectors of the replicated/recirculated messages.

In the data messages that the parameter collecting circuit 150 sends back to the ML machines, this circuit interleaves the weight gradients sent by different ML machines so that weight gradients that are for the same weight in the neural network are next to each other. Because of this, the ML machines do not have to expend resources to gather weight gradients for the same weights before performing a computation (e.g., producing an average) from these gradients. In other words, the parameter collecting circuit 150 in some embodiments reports the weight gradients back to the ML machines in an interleaved manner (that has gradients for the same weights coalesced and reported together) in order to free up the computational resources of the ML machines for other operations.

To help with the interleaving of the weight gradients in the data messages sent to the ML machines, the parameter collecting circuit 150 in some embodiments interleaves the storage of the weight gradients sent by different ML machines so that weight gradients for the same weights are stored in the same storage locations, adjacent storage locations, and/or similarly addressed storage locations. To further assist with this interleaving, the parameter collecting circuit in some embodiments shifts the weight gradients from certain ML machines so that two or more gradients related to the same weight can be stored in the same storage location (e.g., two 16-bit gradients for the same weight can be stored in the same 32-bit SALU register location).

FIGS. 3-6 illustrate an example of this interleaved storage for some embodiments of the invention. In this example, each egress MAU stage has four SALUs that access four stateful tables (e.g., four sets of SALU registers) to store 32 16-bit weight gradients distributed by 12 ML machines 105. The machines are identified by letters A to L, while the gradients are identified by numbers 0-31. The gradients identified by the same numbers are gradients that correspond to the same weight (e.g., weight 1, weight 2, etc.) in the neural network.

For each one of twelve egress MAU stages, each of the FIGS. 3-6 illustrates four SALU storage locations (e.g., four SALU registers) in four SALU tables (e.g., four register sets) that are identified by the same address value (e.g., by the same hash index value that is generated by hashing a set of header vector values). The commonly addressed locations in FIG. 3 store the weight gradients 0-7 from all the machines A-L, the commonly addressed locations in FIG. 4 store the weight gradients 8-15 from all the machines A-L, the commonly addressed locations in FIG. 5 store the weight gradients 16-23 from all the machines A-L, and the commonly addressed locations in FIG. 6 store the weight gradients 24-31 from all the machines A-L.

Also, in this example, the gradients for ML machines A, C, E, G, I, and K are shifted up (i.e., to the left) by 16-bits so that they can be stored respectively next to the gradients from ML machines B, D, F, H, J and L. In some embodiments, the ingress-pipeline parsers 130 initially store each 16-bit weight gradient as the lower 16 bits in a 32-bit container in a header vector. Subsequently, one or more ingress MAU stages (e.g., the action ALUs of these stages) in these embodiments perform a 16-bit leftward shift of the weight gradients from ML machines A, C, E, G, I, and K. As shown, this allows 16-bit gradients from machines A and B to be stored in the same 32-bit register locations, 16-bit gradients from machines C and D to be stored in the same 32-bit register locations, 16-bit gradients from machines E and F to be stored in the same 32-bit register locations, 16-bit gradients from machines G and H to be stored in the same 32-bit register locations, 16-bit gradients from machines I and J to be stored in the same 32-bit register locations, and 16-bit gradients from machines K and L to be stored in the same 32-bit register locations.

FIGS. 3-6 also illustrate that by producing the storage address index values differently for different pairs of ML machines, the parameter collecting circuit can use different rotated storage patterns for different pairs of ML machines. For instance, for gradients from ML machines A and B, the parameter collecting circuit produces index values to store the gradients 0-7 in the first two egress MAU stages, gradients 8-15 in the last two egress MAU stages, gradients 16-23 in the egress MAU stages 8 and 9, and gradients 24-31 in the egress MAU stages 6 and 7. On the other hand, for gradients from ML machines C and D, the parameter collecting circuit produces index values to store the gradients 0-7 in the egress MAU stages 2 and 3, gradients 8-15 in the first two egress MAU stages, gradients 16-23 in the last two egress MAU stages, and gradients 24-31 in the egress MAU stages 8 and 9.

This rotated storage approach makes it easier to read out weight gradients 0-7 from all the machines A-L together, weight gradients 8-15 from all the machines A-L together, weight gradients 16-23 from all the machines A-L together, and weight gradients 24-31 from all the machines A-L together. Specifically, for the replication approach illustrated in FIG. 2, each egress MAU stage would store in each of the four recirculated/replicated messages the gradient values that are stored at one common index address location in the stage's SALU registers. Accordingly, the gradient values stored in FIG. 3 would be stored in a first message of these four messages, the gradient values stored in FIG. 4 would be stored in a second message, the gradient values stored in FIG. 5 would be stored in a third message, and the gradient values stored in FIG. 6 would be stored in a fourth message.

Figure 7:
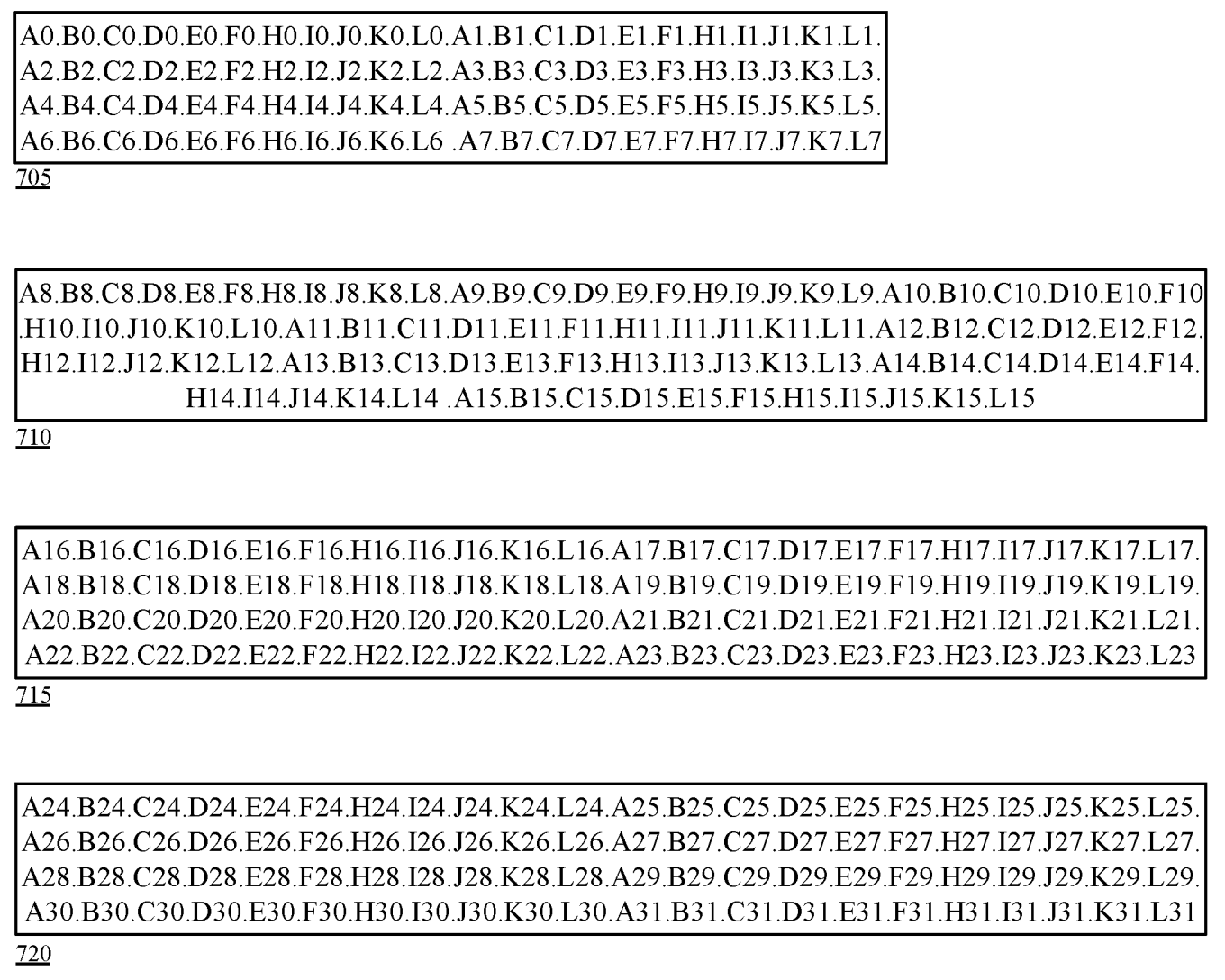

For the example illustrated in FIGS. 3-6 (with twelve ML machines A-L and 32 gradients 0-31), FIG. 7 illustrates the sequence of weight gradients that are included in the four data messages 705-720 that the parameter collecting circuit 150 sends to each ML machine 105 in some embodiments. As shown, the data message 705 includes the weight gradients 0-7 from all the machines A-L, with the weight 0 gradients first, followed by all the gradients of the other weights in sequence through the gradients of the 7th weight. Similarly, the data message 710 includes the weight gradients 8-15 from all the machines A-L, with the weight 8 gradients first, followed by all the gradients of the other weights in sequence through the gradients of the 15th weight.

The data message 715 includes the weight gradients 16-23 from all the machines A-L, with the weight 16 gradients first, followed by all the gradients of the other weights in sequence through the gradients of the 23rd weight. Finally, the data message 720 includes the weight gradients 24-31 from all the machines A-L, with the weight 24 gradients first, followed by all the gradients of the other weights in sequence through the gradients of the 31st weight.

Figure 8:
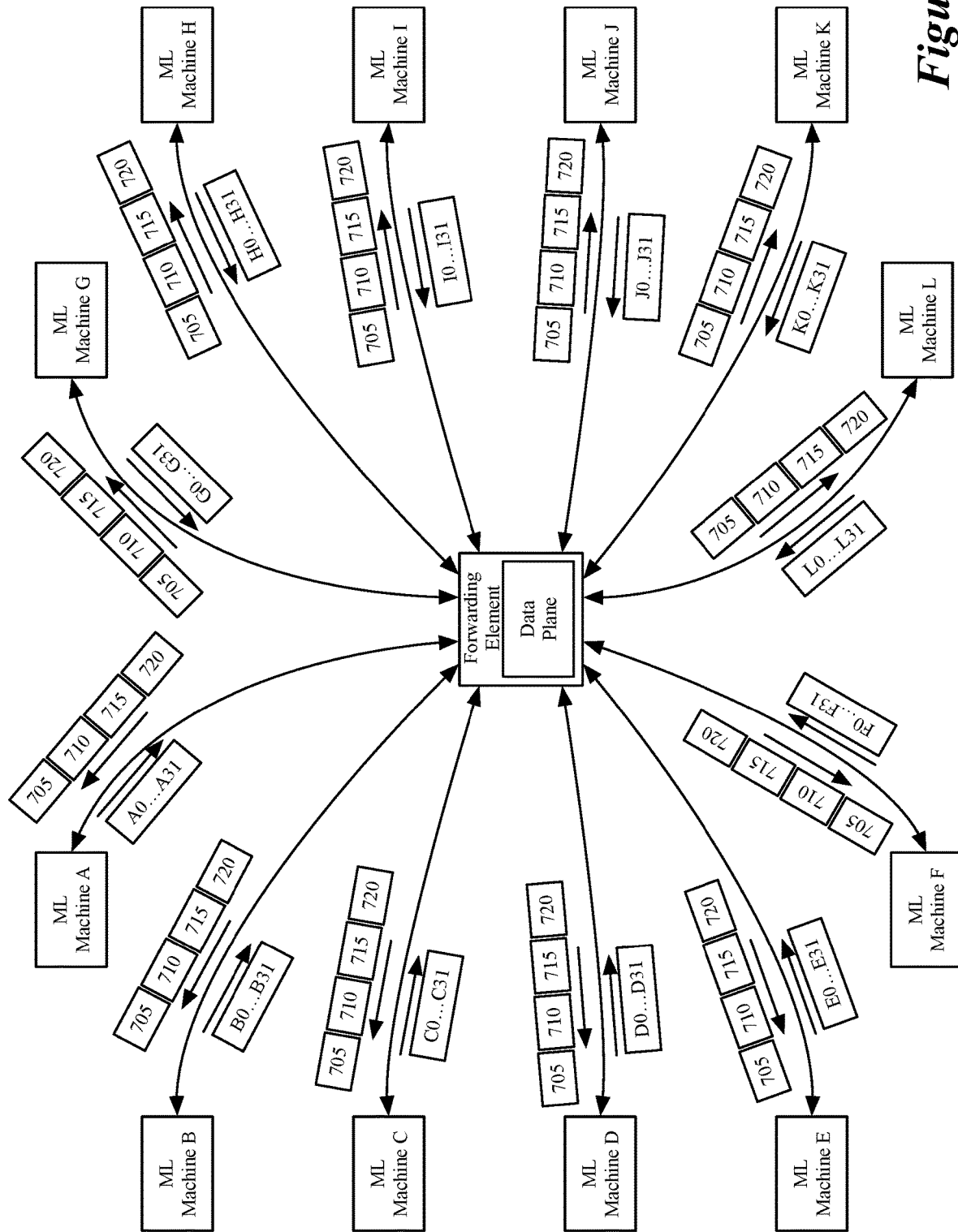
FIG. 8 illustrates the data messages exchanged between the twelve ML machines A-L and the data plane in the all-gather example of FIGS. 3-7.

FIG. 8 illustrates the data messages exchanged between the twelve ML machines A-L and the data plane 120 in the all-gather example of FIGS. 3-7. As shown, each of the ML machines sends a data message with 32 weight gradients identified by the numbers 0-31 and the letter associated with the ML machine (e.g., A0-A31 are sent by ML machine A, B0-B31 are sent by ML machine B, and so on). This figure also shows that after collecting the weight gradients from all the ML machines A-L, the data plane 120 sends the four messages 705-720 of FIG. 7 to each of the ML machines.

These messages contain all the collected weight gradients with message 705 including weight gradients A0-L7, message 710 including weight gradients A8-L15, message 715 including weight gradients A16-L23, and message 720 including weight gradients A24-L31, as illustrated in FIG. 7. For each of the 32 weights, each ML machine M-L in some embodiments computes an average weight gradient by adding the gradients that it receives for that weight and then dividing that sum by the number of ML machines, which in this example is twelve.

The embodiments described above keep constant the index values during the retrieval of the stored weight gradients from the SALU registers but change the index values during the storing of the gradients in the SALU registers. Other embodiments, on the other hand, change the index values during the retrieval of the stored weight gradients from the SALU registers while keeping constant the index values during the storing of the gradients in the SALU registers.

Different embodiments use different approaches to make sure that different stages of the data-plane generate the same memory index for the same parameter identifiers. Some embodiments generate a hash identifier to memory index based on a common hash function. When receiving the result of a memory index, these MAUs in these embodiments push to the next memory index. In other embodiments, the MAU stages keep an ordered list of parameters. When they gather the result of a memory index, the MAU stages push to the next memory index. This approach assumes that no packet is lost or re-ordered. Still other embodiments use a circuit in the forwarding element direct the MAU stages to use a particular identifier to send for a particular memory index. Upon sending the result from a memory index, the data plane also includes the identifier of the next parameter that should be sent for that memory index.

Other embodiments also implement the parameter collecting circuit 150 differently in the data plane 120. For instance, other embodiments implement the parameter extractor 152, parameter storage 154 and parameter forwarding circuit 156 with different number of stages and/or with different numbers of SALUs and stateful tables than the exemplary embodiments described above. While several embodiments were described in which the egress MAU stages were used to implement the parameter storage 154, other embodiments use the SALUs of the ingress MAUs to implement some or all of the parameter storage 154. Sill other embodiments use SALUs of both the ingress and egress MAUs to implement the parameter storage 154.

In other embodiments, the data plane has a dedicated parameter collection circuit that does not use re-purposed message processing stages for parameter distribution operations. Alternatively, other embodiments use other data plane configurations to implement the parameter collecting circuit 150. For instance, in some embodiments, the traffic manager 144 includes a mirror buffer that includes the set of storages that store the parameter values contained in the data messages sent by the ML machines. When the MAU that implements the bit map generator determines that the last ML machine has provided the data message with the last weight gradient set in a group of gradients, it sets a bit in the message's associated header vector to notify the traffic manager that after processing this message, the traffic manager should have all the gradients in a group of gradients.

Based on this setting, the traffic manager's retrieves the stored parameter values from the mirror buffer, generates one or more messages for each ML machine, embeds the retrieved stored parameter values in each of the generated messages, and provides the generated data messages to one or more egress pipelines for forwarding to the ML machines. In some embodiments, the generated messages have to be recirculated back to the ingress pipelines to identify the egress pipelines that are supposed to process each message for each ML machine. In other embodiments, the TM is configured with the addresses of these ML machines.

Figure 9:
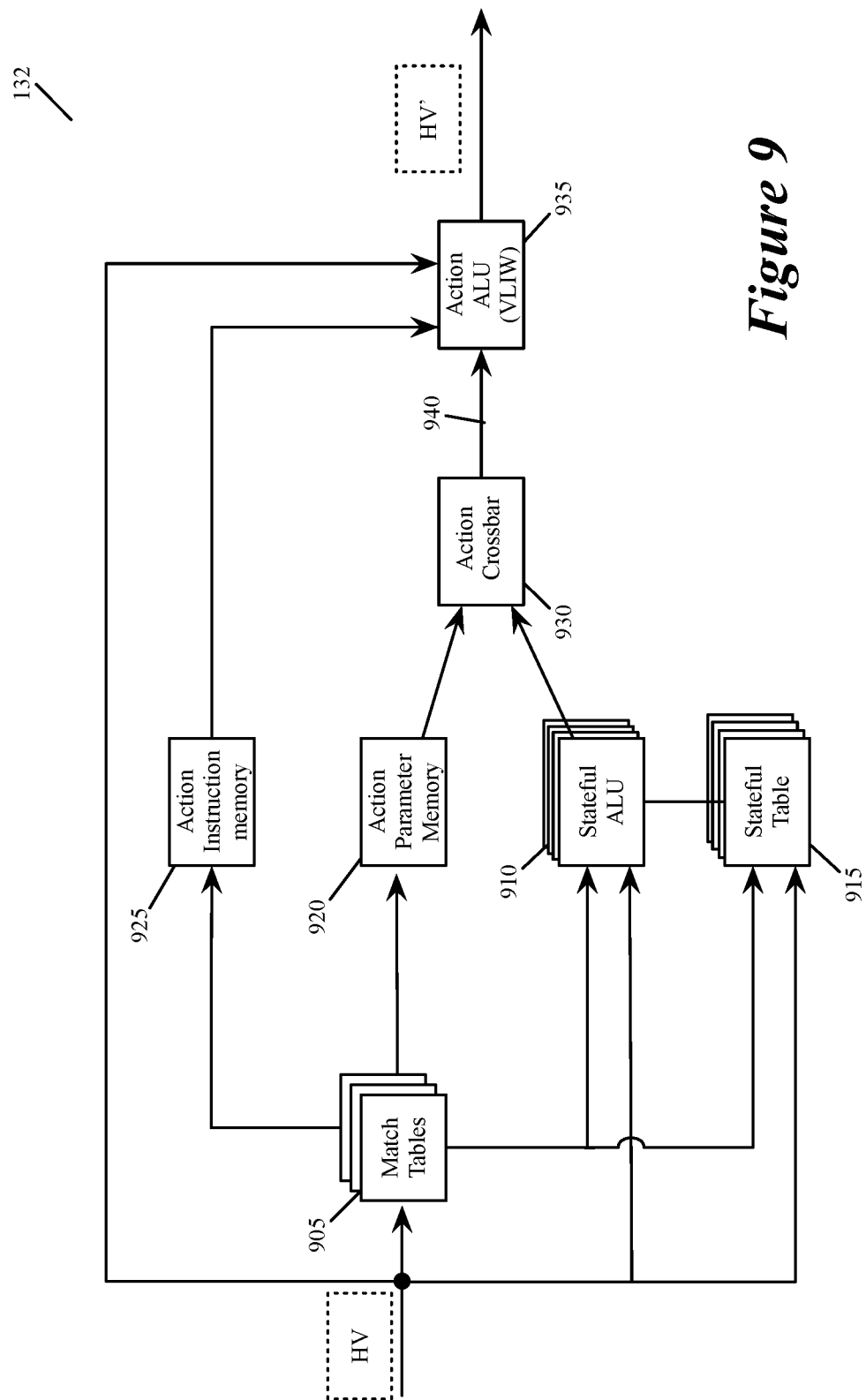
FIG. 9 illustrates a match action unit of some embodiments.

FIG. 9 illustrates a match action unit 132 of some embodiments. As mentioned above, an ingress pipeline 140 or egress pipeline 142 in some embodiments has several MAU stages 132, each of which includes message-processing circuitry for forwarding received data messages and/or performing stateful operations based on header vectors associated with the data message. In some embodiments, the control plane 125 of the forwarding element 100 or a remote control plane configures the MAU stages 132 of the data plane 120 to implement not only the forwarding operations of these MAU stages, but also the parameter collecting operations that some of the MAU stages 132 perform. These operations are performed by processing values stored in the header vectors that are generated for the data messages.

The stateful operations of the data plane are enabled by the data plane's ability to store data that it generates from processing earlier data messages for processing subsequent data messages. To perform stateful parameter collecting operations, the parameter collecting MAU stages 132 in some embodiments use their stateful ALUs 910 and their associated stateful tables 915, as shown in FIG. 9. In addition to the stateful ALUs 910 and stateful tables 915, the MAU stage 132 in some embodiments has a set of one or more match tables 905, an action crossbar 930, an action parameter memory 920, an action instruction memory 925, and an action ALU 935.

The match table set 905 can compare one or more fields in a received message's header vector to identify one or more matching flow entries (i.e., entries that match the message's HV). The match table set 905 can include TCAM (ternary content addressable memory) tables or exact match tables in some embodiments. In some embodiments, the match table set can be accessed at an address that (1) is a value extracted from one or more fields of the message's header vector, or (2) is a hash of this extracted value. In some embodiments, the local control plane, or a remote control plane, supplies flow entries (e.g., the flow-match identifiers and/or action identifiers) to store in one or more match tables and associated action tables.

In some embodiments, the value stored in a match table record that matches a message's flow attributes, or that is accessed at a hash-generated address from one or more message flow attributes, provides addresses of records to access and process in the action parameter memory 920 and action instruction memory 925. Conjunctively or alternatively, a match table record in some embodiments has an associated record in the action instruction memory and/or an associated record in the action parameter memory that specifies an action instruction to execute and/or an action parameter to process. The actions performed by the MAU stage 132 can include actions that the forwarding element has to perform on a received data message to process the data message (e.g., to drop the message, or to forward the message to its destination machine or to other intervening forwarding elements).

Also, in some embodiments, the value stored in a match table record that matches a message's flow identifier, or that is accessed at a hash-generated address, can provide an address and/or parameter for one or more records in the stateful table set 915, and can provide an instruction and/or parameter for the set of stateful ALUs 910. As shown, the stateful ALUs 910 and the stateful tables 915 also receive a processed message's header vector. The header vectors can include instructions and/or parameters for the stateful ALUs, while containing addresses and/or parameters for the stateful tables 915.

The stateful ALUs 910 in some embodiments perform one or more stateful operations, while stateful tables 915 store state data used and generated by the stateful ALUs 910. In some embodiments, the stateful ALUs perform operations synchronously with the data flow of the message-processing pipeline (i.e., synchronously at the data line rate of the data plane 120). As such, the stateful ALUs can process a different header vector on every clock cycle, thus ensuring that the stateful ALUs would be able to operate synchronously with the dataflow of the message-processing pipeline.

In some embodiments, the local or remote control plane provides configuration data to program the stateful ALUs 910 of the MAUs 132 of the data plane 120. The stateful ALU 910 outputs an action parameter to the action crossbar 930. The action parameter memory 920 also outputs an action parameter to this crossbar 930. The action parameter memory 920 retrieves the action parameter that it outputs from its record that is identified by the address provided by the match table set 905. The action crossbar 930 in some embodiments maps the action parameters received from the stateful ALUs 910 and action parameter memory 920 to an action parameter bus 940 of the action ALU 935. This bus provides the action parameter to this ALU 935. For different data messages, the action crossbar 930 can map the action parameters from stateful ALUs 910 and memory 920 differently to this bus 940. The crossbar can supply the action parameters from either of these sources in their entirety to this bus 940, or it can concurrently select different portions of these parameters for this bus.

The action ALU 935 also receives an instruction to execute from the action instruction memory 925. This memory 925 retrieves the instruction from its record that is identified by the address provided by the match table set 905. The action ALU 935 also receives the header vector for each message that the MAU processes. Such a header vector can also contain a portion or the entirety of an instruction to process and/or a parameter for processing the instruction.

The action ALU 935 in some embodiments is a very large instruction word (VLIW) processor. The action ALU 935 executes instructions (from the instruction memory 925 or the header vector) based on parameters received on the action parameter bus 940 or contained in the header vector. The action ALU stores the output of its operation in the header vector in order to effectuate a message forwarding operation and/or stateful operation of its MAU stage 132. The output of the action ALU forms a modified header vector (HV') for the next MAU stage or the deparser. In some embodiments, examples of such actions include (1) bit shifting some of the weight gradients in the header vector, and (2) the writing of parameters stored in the SALU tables in the header vectors.

In other embodiments, the match tables 905 and the action tables 915, 920 and 925 of the MAU stage 132 can be accessed through other methods as well. For instance, in some embodiments, each action table 915, 920 or 925 can be addressed through a direct addressing scheme, an indirect addressing scheme, and an independent addressing scheme. The addressing scheme that is used depends on the configuration of the MAU stage, which in some embodiments, is fixed for all data messages being processed, while in other embodiments can be different for different data messages being processed.

In the direct addressing scheme, the action table uses the same address that is used to address the matching flow entry in the match table set 905. As in the case of a match table 905, this address can be a hash generated address value or a value from the header vector. Specifically, the direct address for an action table can be a hash address that a hash generator (not shown) of the MAU generates by hashing a value from one or more fields of the message's header vector. Alternatively, this direct address can be a value extracted from one or more fields of the header vector.

On the other hand, the indirect addressing scheme accesses an action table by using an address value that is extracted from one or more records that are identified in the match table set 905 for a message's header vector. As mentioned above, the match table records are identified through direct addressing or record matching operations in some embodiments.

The independent address scheme is similar to the direct addressing scheme except that it does not use the same address that is used to access the match table set 905. Like the direct addressing scheme, the table address in the independent addressing scheme can either be the value extracted from one or more fields of the message's header vector, or it can be a hash of this extracted value. In some embodiments, not all the action tables 915, 920 and 925 can be accessed through these three addressing schemes, e.g., the action instruction memory 925 in some embodiments is accessed through only the direct and indirect addressing schemes. Also, other addressing schemes are used to address some of the tables (e.g., action tables).

Figure 10:
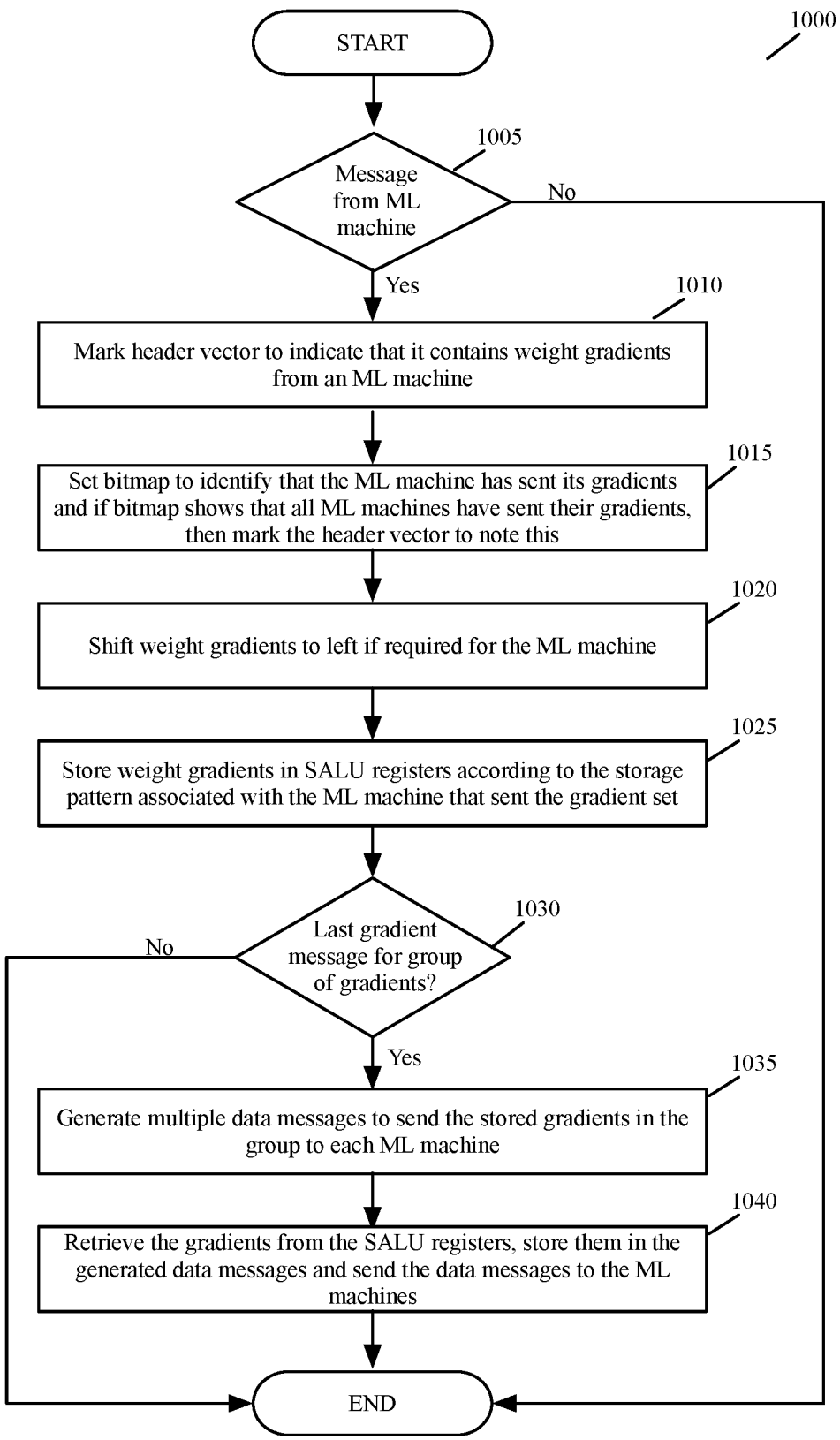
FIG. 10 conceptually illustrates a process that the parameter collecting circuit performs in some embodiments.

FIG. 10 conceptually illustrates a process 1000 that the parameter collecting circuit 150 performs in some embodiments. The MAU stages 132 that implement the parameter collecting circuit 150 in some embodiments have the MAU circuit architecture illustrated in FIG. 9. In some embodiments, the process 1000 is performed for each received data message that is processed by the data plane 120 from each particular ML machine. As shown, the data plane 120 initially determines (at 1005) whether the data message is from an ML machine. In some embodiments, an ingress MAU stage 132 makes this determination by matching the received data message's source information (e.g., the source IP address and/or source port address in the message's associated header vector that the MAU is processing) with a record in its match table 905.

When the data message is not from an ML machine, the process 1000 ends and the data plane 120 processes this message's header vector according to its configured forwarding operations, in order to forward the data message along its path to the message's destination. Alternatively, when the data message is from a particular ML machine, the ingress MAU stage (that determined that the message came from a particular ML machine) marks (at 1010) the header vector to indicate that it is one that contains weight gradients from the particular ML machine.

Next, at 1015, this MAU stage or another MAU stage has its SALU 910 set a bit in a bitmap that it maintains in its stateful ALU table 915 to identify that the particular ML machine has provided its set of weight gradients for a particular group of weights. In some embodiments, this bit is set after the weight gradient set has been processed (i.e., after the gradients in this set have been stored). In setting the bitmap (at 1015), the SALU 910 also outputs in some embodiments the bitmap so that the SALU 910, its associated action ALU 935 or a subsequent MAU 132 can analyze the bitmap and determine whether all the bits have been set to indicate that all the ML machines have provided their weight gradient sets for a particular group of weights. When an MAU stage determines that the bitmap indicates that all the ML machines have provided their weight gradient sets, the action ALU of that stage marks the header vector to indicate that this vector's data message has provided the last weight gradient set for the particular group of weights.

At 1020, the action ALUs of the ingress MAUs 132 shift the weight gradients to the left by 16-bits when the weight gradients are sent by certain ML machines (e.g., machines A, C, E, G, I, and K). This shifting allows the weight gradients for these machines to be eventually stored in the same registers as the corresponding weight gradients from the other machines (e.g., machines B, D, F, H, and L), as shown in FIGS. 3-6.

In some embodiments, each 16-bit weight gradient is initially stored by an ingress pipeline parser 130 in the least significant 16 bits of a 32-bit container for that gradient (i.e., for that weight) in the header vector. When the data message is from the subset of ML machines that need their gradients shifted, one or more header vector attributes (e.g., source IP/port address, ML machine identifier, etc.) matches in some embodiments a record of a match table in an ingress MAU. This matching record has an associated action record that directs the action ALU of that stage to shift the 16-bit gradient from the least significant 16 bits of its container to its most significant 16 bits.

At 1025, the process 1000 then extracts each weight gradient from its container in the header vector and stores them in the SALU registers of the egress MAUs according to the storage pattern configured for that weight gradient and the data message's source ML machine. Examples of such storage patterns were described above by reference to FIGS. 3-6. The pattern in this example has eight of twelve egress MAU stages storing four weight gradients from the 32 weight gradients distributed by each ML machine in some embodiments.

Next, at 1030, the process 1000 determines whether the data message is the last gradient message that provided the final weight gradient set for the group of weights. In some embodiments, after all the weight gradients have been stored for the last data message by several MAU stages, the final MAU stage or an MAU stage after this one then updates the bitmap, determines from the updated bitmap that all the weight gradient sets have been collected, and then marks the header vector of the last data message for recirculation back through the ingress and egress pipelines so that the stored weight gradients can be retrieved from the MAU stages. Other embodiments perform the determination and operation at 1035 differently.

At 1035, the TM 144 generates several replicated data messages for each ML machine from the last data message. It then passes these replicated data messages through the egress MAU pipeline that stores all the collected weight gradients. These egress MAU stages then store the collected weight gradients according to the desired reporting pattern (e.g., the pattern shown in FIG. 7) the header vectors associated with each ML machine's data messages. In some embodiments, each SALU of an egress MAU outputs the desired weight gradients from its SALU registers, and the egress MAU's action ALU writes the outputted weight gradients in the desired 32-bit containers at the desired location in the header vector. These header vectors are then packaged by the egress pipeline deparser 134 into data messages that are forwarded to the ML machines through a direct wire connection or through intervening network fabric.

In some embodiments, the data plane 120 is configured to perform all-reduce parameter-collecting operations instead of all-gather parameter-collecting operations. For instance, the data plane 120 in some embodiments adds the different weight gradients that it collects from the ML machines 105 for the same weight values in a neural network and distributes to the ML machines the aggregated weight gradients for each of several weights in the neural network. To perform its all-gather operations, the data plane 120 converts floating-point weight gradients that it receives from the ML machines to fixed-point weight-gradients that it aggregates and then converts the aggregated fixed-point values back to aggregated floating-point weight gradients that it distributes back to the ML machines.

Figure 11:
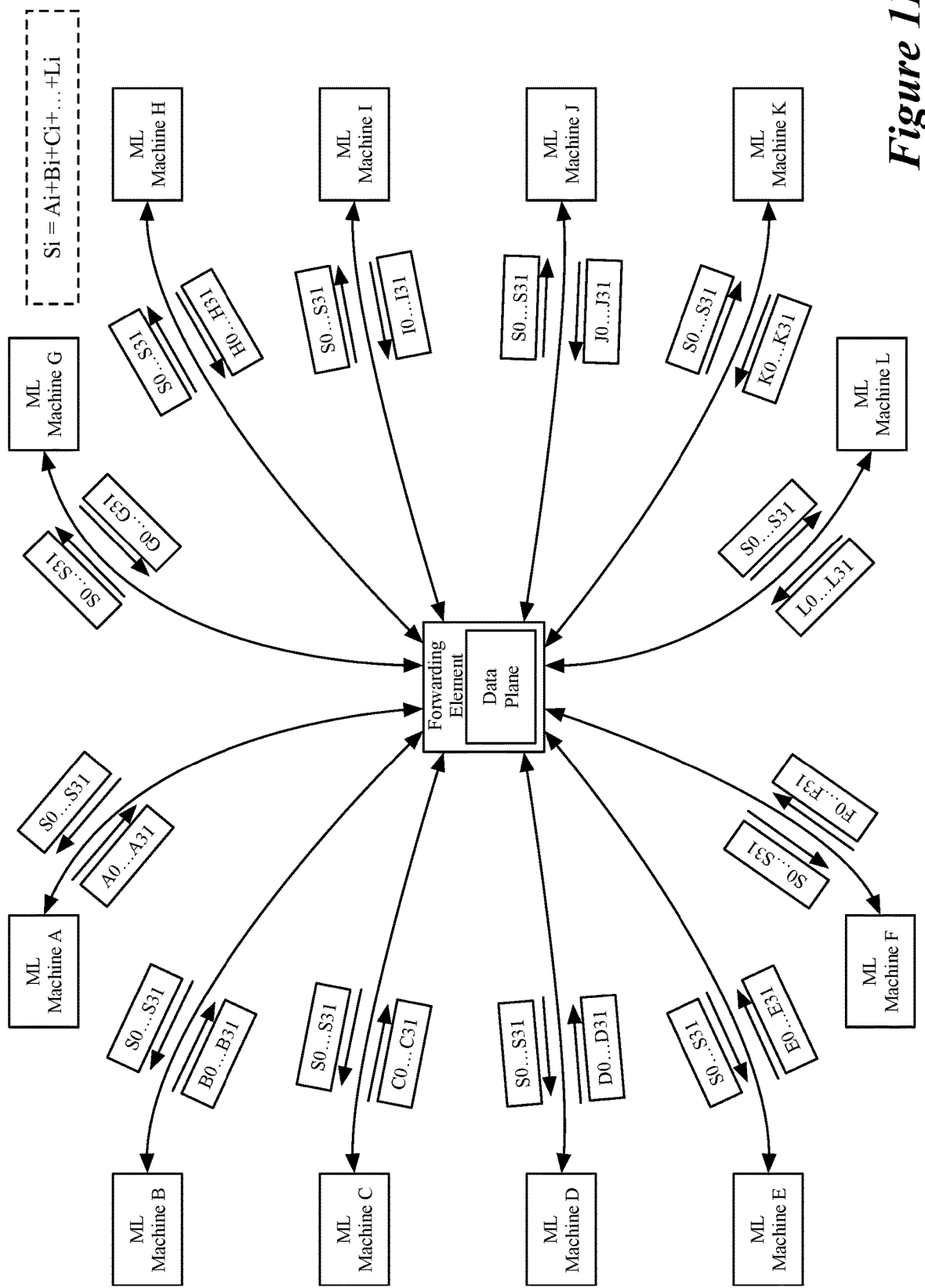
FIG. 11 illustrates the interaction between the data plane and the ML machines when the data plane operates in an all-reduce implementation in some embodiments.

FIG. 11 illustrates the interaction between the data plane 120 and the ML machines 105 when the data plane 120 operates in an all-reduce implementation. Like FIG. 8, FIG. 11 shows the data plane receiving 32 weight gradients 0-31 from twelve ML machines A-L. However, unlike its all-gather operation, the data plane during its all-reduce operation adds the received weight gradients that correspond to the same weight I, and then distributes to the ML machines one data message with one aggregated SI value for each weight I.

For each of the 32 weights, the S value equals the sum of the twelve weight gradients that the data plane receives from the twelve ML machines A-L for that weight, as shown in FIG. 11. Each ML machine A-L then computes an average gradient for each weight by dividing the gradient sum SI that it receives for each weight gradient I by the number of ML machines, which in this example is twelve.

Figure 12:
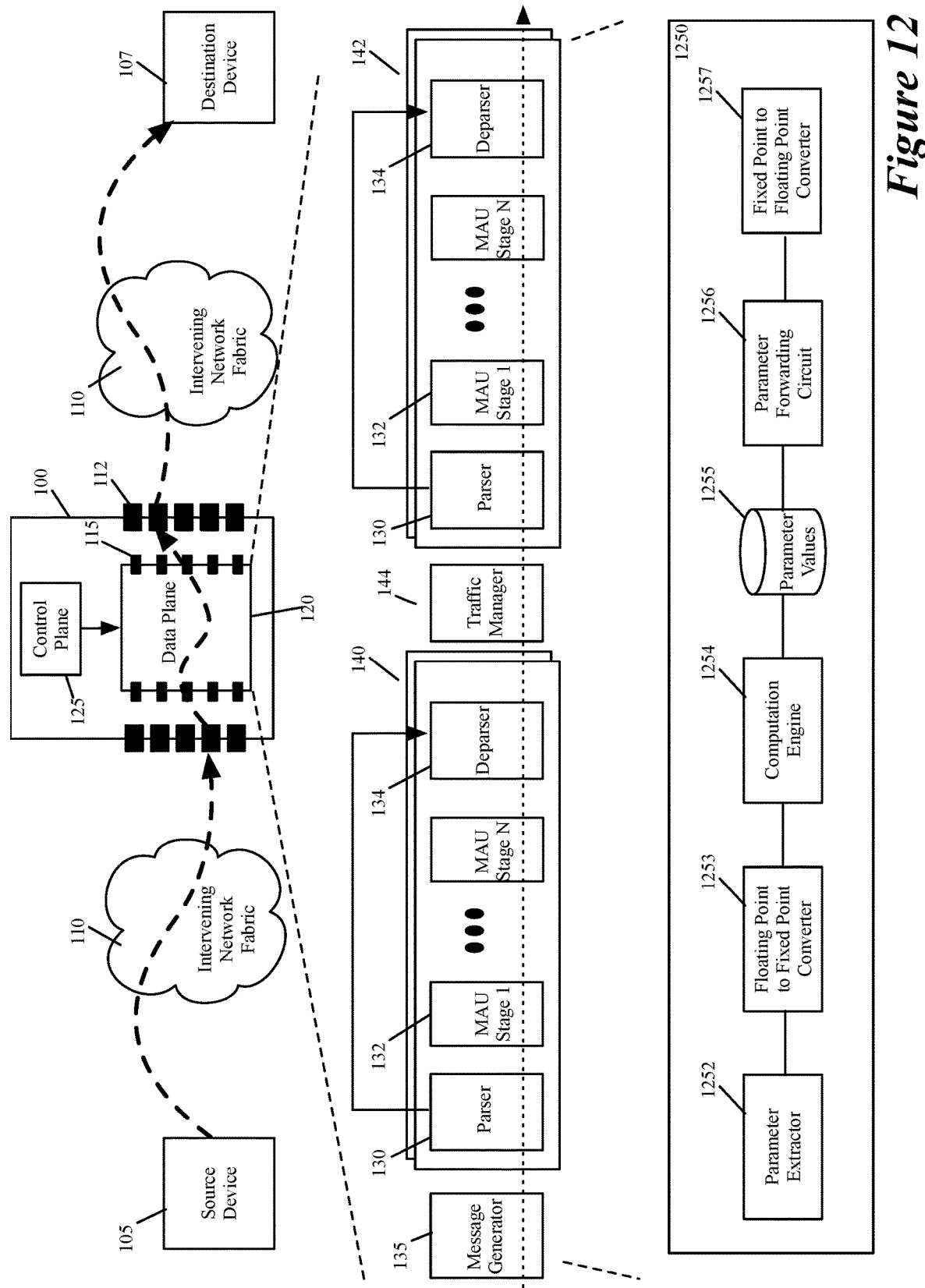
FIG. 12 conceptually illustrates the components of a parameter collecting circuit in some embodiments when the data plan is configured to perform an all-reduce operations in some embodiments.

FIG. 12 conceptually illustrates the components of the parameter collecting circuit 1250 when the data plan 120 is configured to perform an all-reduce operations in some embodiments. As shown, the parameter collecting circuit 1250 conceptually includes a parameter extractor 1252, a floating-point to fixed-point converter 1253, a computation engine 1254, a parameter storage 1255, a parameter forwarding circuit 1256 and a fixed-point to floating-point converter 1257.

In examining a header vector for a received data message, the parameter extractor 152 in some embodiments determines that the data message originated from an ML machine 105 and contains a set of weight gradients. The weight gradients are received in a floating-point format (e.g., a half-precision, floating-point format) in some embodiments. As the data plane 120 performs its gradient additions in a fixed-point format, the parameter extractor 152 has the floating-point to fixed-point converter 1253 convert each gradient stored in the header vector to a fixed-point format. As further described below, this converter in some embodiments converts each gradient value from a 16-bit floating format that is stored in a 32-bit container in the header vector to a 43-bit fixed-point value that is stored as 21-bit and 22-bit values in two 32-bit containers Y and Z.

The computation engine 1254 then adds each converted fixed-point gradient value for a weight to an aggregate gradient value stored in the storage 1255 for that weight. When the received data message is the first data message that provides the first set of weight gradients from a group of ML machines, the computation engine 1254 simply saves the converted fixed-point gradient value for each weight in the storage 1255 for that weight. In the embodiments where the received data message has 32 gradients for 32 weights and each gradient is received as a 16-bit half-precision floating point value that is converted into a 43-bit fixed-point value stored in two 32-bit containers Y and Z, the computation engine 1254 adds the values of the 32-bit containers Y and Z for a weight to two 32-bit storage locations for that weight in the storage 1255. Again, when the received data message is the first data message that provides the first set of weight gradients from a group of ML machines, the computation engine 1254 simply saves the values of the 32-bit containers Y and Z for a weight in the two 32-bit storage locations for that weight in the storage 1255.

Once all the weight gradient sets from all the ML machines have been received and the computation engine 1254 has produced a sum for each weight (i.e., by adding all the gradients that the parameter collecting circuit 1250 receives for each weight), the parameter forwarding circuit 1256 embeds the generated sums in several (e.g., twelve) data messages that it sends to several (e.g., twelve) ML machines. Before the parameter collecting circuit 1250 sends these messages, the fixed-point to floating-point converter 1257 converts each gradient sum from a fixed-point format to a floating-point format.

Figure 13:
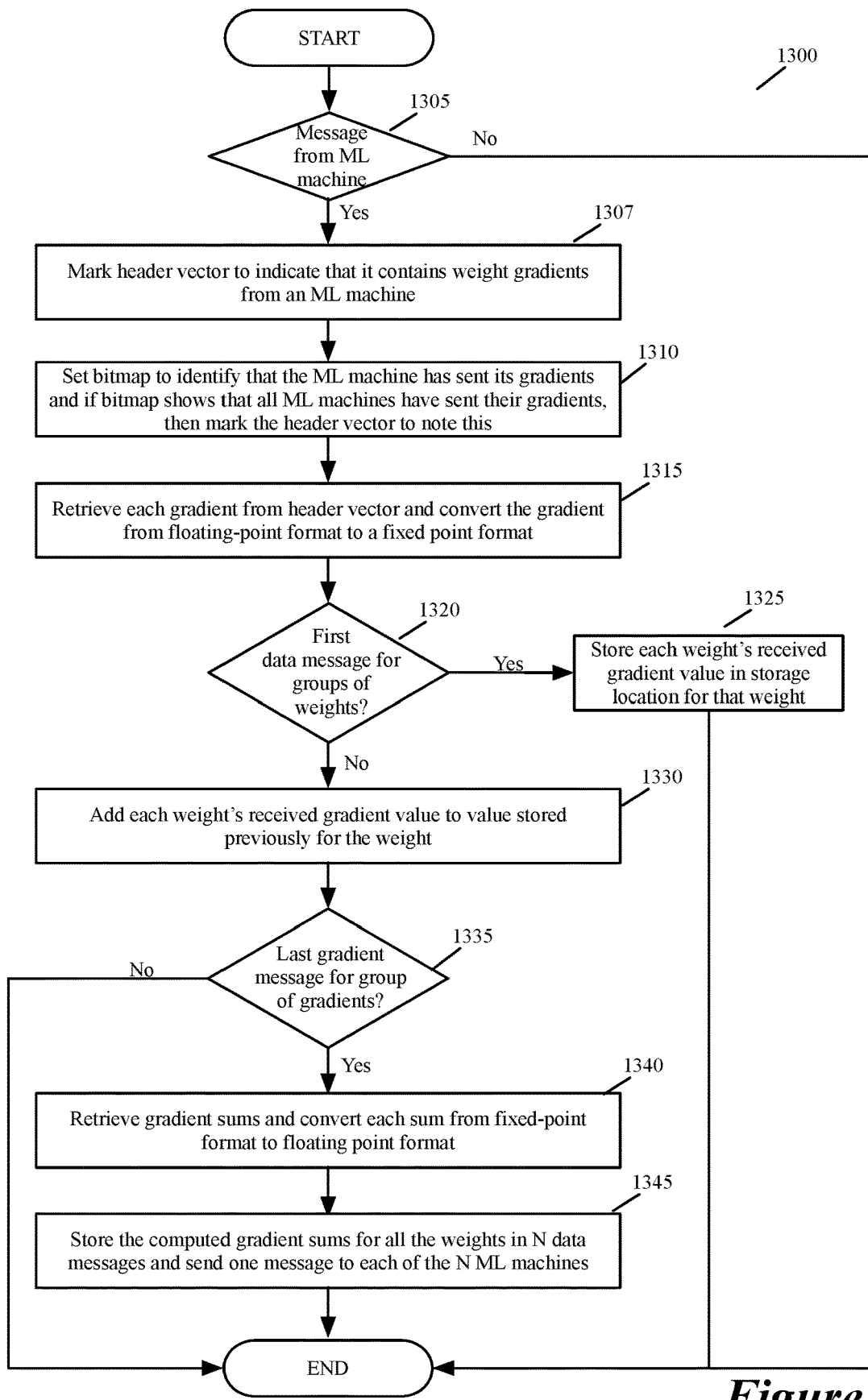
FIG. 13 conceptually illustrates a process that a parameter collecting circuit performs in some embodiments.

FIG. 13 conceptually illustrates a process 1300 that the parameter collecting circuit 1250 performs in some embodiments. The MAU stages 132 that implement the parameter collecting circuit 1250 in some embodiments have the MAU circuit architecture that was described above by reference to FIG. 9. In some embodiments, the process 1300 is performed for each received data message that is processed by the data plane 120 from each particular ML machine. As shown, the data plane 120 initially determines (at 1305) whether the data message is from an ML machine. In some embodiments, an ingress MAU stage 132 makes this determination by matching the received data message's source information (e.g., the source IP address and/or source port address in the message's associated header vector that the MAU is processing) with a record in its match table 905.

When the data message is not from an ML machine, process 1300 ends and the data plane 120 processes this message's header vector according to its configured forwarding operations, in order to forward the data message along its path to the message's destination. Alternatively, when the data message is from a particular ML machine, the ingress MAU stage (that determined that the message came from a particular ML machine) marks (at 1307) the header vector to indicate that it is one that contains weight gradients from the particular ML machine.

Next, at 1310, this MAU stage, or another MAU stage, has its SALU 910 set a bit in a bitmap that it maintains in its stateful ALU table 915 to identify that the particular ML machine has provided its set of weight gradients for a particular group of weights. In some embodiments, this bit is set after the weight gradient set has been processed (i.e., after the gradients in this set have been added to the gradient sums that are being maintained for the group of weights). In setting the bitmap (at 1310), the SALU 910 also outputs in some embodiments the bitmap so that the SALU 910, its associated action ALU 935, or a subsequent MAU 132 can analyze the bitmap and determine whether all the bits have been set to indicate that all the ML machines have provided their weight gradient sets for a particular group of weights. When an MAU stage determines that the bitmap indicates that all the ML machines have provided their weight gradient sets, the action ALU of that stage marks the header vector to indicate that this vector's data message has provided the last weight gradient set for the particular group of weights. As mentioned above, the data plane in other embodiments uses other schemes (e.g., a counter) to identify when the data plane has weight gradient sets from all the ML machines.

Figure 14:
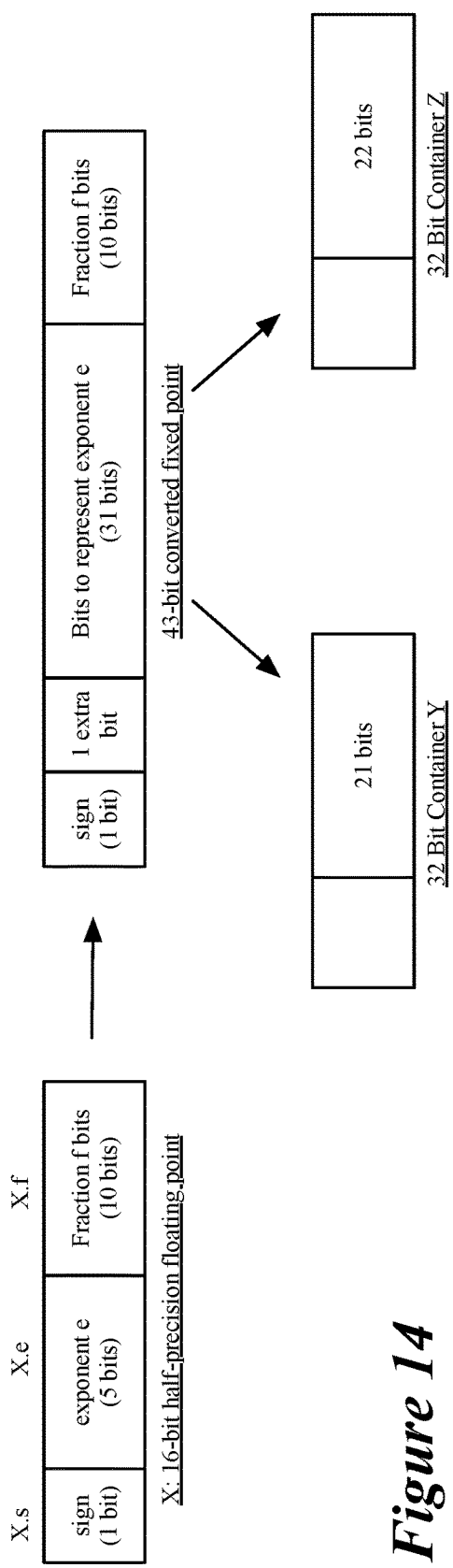
FIG. 14 illustrates an example of a 16-bit floating point value, its corresponding 43-bit fixed point value, and two containers to store the 43-bit fixed point value.

At 1315, the process 1300 then retrieves in several successive MAU stages each weight gradient from the header vector and converts each retrieved gradient from a floating-point format to a fixed-point format. In some embodiments, each weight gradient is 16-bit value that expresses a floating-point number in a half-precision format. FIG. 14 illustrates an example of such a 16-bit value X. As shown, the most significant bit (MSB) of this 16-bit value is the sign bit X.s. The next five bits are the exponent bits X.e, and the final 10 bits are the fraction bits X.f, also called the significand or mantissa bits. This 16-bit value expresses a floating point number according to the following two equations:

Floating point number $N =$ $(-1)^{X.s} * 2^{-14} * 0.X.f$ when $X.e \neq 0$(subnormal case), or $(-1)^{X.s} * 2^{X.e-15} * 1.X.f$ when $X.e \neq 0$.

FIG. 14 also illustrates that the MAUs in some embodiments convert each received 16-bit floating point gradient value (that is stored in a 32-bit container in the header vector) to a 43-bit fixed-point value that is stored as 21 bits and 22 bits in two 32-bit containers Y and Z. As shown, the 43 bits account for (1) 1 sign bit, (2) 1 extra bit to account for the "1.X.f" component of the above-described floating point equation for when the floating point exponent (X.e) is not zero, (3) a 31 bit value to represent each possible exponent value from a 5-bit exponent (X.e) without accounting for the zero exponent value, and (4) the 10 fraction bits (X.f).

The container Y is referred to below as the upper container (as it stores the upper 21 bits of the 43-bit value), while the container Z is referred to as the lower container (as it stores the lower 22 bits of the 43-bit value). The 32-bit containers Y and Z have sufficient extra MSBs (11 for Y and 10 for Z) to account for carry values that may result while adding weight gradients. When there are twelve ML machines A-L, at most 4 extra bits are needed in the MSBs of these containers to account for the carry values. A process for converting a weight gradient from a fixed-point format to a floating-point format will be described below by reference to FIG. 15.

After converting the weight gradients from their floating-point formats to their fixed-point formats, the process determines (at 1320) whether the received data message is the first message that provides the first weight gradient set for a group of weights. In some embodiments, an MAU maintains a bit in its SALU register to indicate whether any prior data messages have been received for a group of weights. Upon receiving the first data message, the MAU has its action ALU set a value in the header vector to notify the other MAU stages that the data message is a first data message, and its SALU changes the value of the bit it maintains. After changing this bit, the MAU no longer modifies this value until its registers are reset after all the weight gradients for a group of weights have been collected. In other embodiments, the MAU that maintains the first-message bit for a group of weights is one of the MAUs that implements the computation engine 1254 that accumulates one or more weight gradients in one or more of its SALU registers. In still other embodiments, the MAU that performs the determination at 1320 assesses the bitmap maintained in the data plane. Still other embodiments make this determination differently.

When the process 1300 determines (at 1320) that the received data message is the first message that provides the first weight gradient set for a group of weights, several MAU stages store the fixed-point converted weight gradients in their respective SALU registers. As each 43-bit weight gradient is stored as 21 bits and 22 bits in two 32-bit containers Y and Z in the header vector, and each SALU has four sets of SALU 32-bit wide registers, each MAU stage stores two 43-bit weight gradient values in four 32-bit SALU registers in some embodiments. After 1325, the process ends.

On the other hand, when the process 1300 determines (at 1320) that the received data message is not the first message that provided the first weight gradient set for the group of weights, several MAU stages add (at 1330) the fixed-point converted weight gradients to the values stored in their respective SALU registers. For a particular weight gradient m that is stored in two 32-bit containers Ym and Zm in the header vector, a particular MAU maintains the sum for the weight gradient m in two 32-bit registers, one that corresponds to the upper Y container and the other that corresponds to the lower Z container. For this weight gradient m, the particular MAU adds the 32-bit values in containers Ym and Zm to these two 32-bit registers.

Next, at 1335, the process 1300 determines whether the data message is the last gradient message that provided the final weight gradient set for the group of weights. In some embodiments, each MAU that accumulates the weight gradients makes this determination based on the value of the bitmap, and upon making this determination it outputs (at 1340) the weight gradient sums that it has maintained into the header vector. In other embodiments, after all the weight gradients have been accumulated for the last data message by several MAU stages, the final MAU stage or an MAU stage after this one then updates the bitmap, determines from the updated bitmap that all the weight gradient sets have been collected, and then marks the header vector of the last data message for recirculation back through the ingress and egress pipelines so that the weight gradients can be retrieved from the MAU stages. Other embodiments perform the determination and operation at 1335 differently.

Irrespective of how the collection-completion determination is made at 1335, the process 1300 (at 1340) retrieves the gradient sums collected for each weight in the SALU registers, stores the result of the sum in two 32-bit Y and Z containers, and converts each sum from a fixed-point representation that spans the two containers into one 16-bit representation that is stored in the header vector. The data plane operations for performing this conversion will be described below by reference to FIG. 15.

After the weight gradient sums are converted into half-precision 16-bit floating point values, the process (at 1345) generates one data message for each ML machine, embeds the 16-bit floating point weight gradient sums into each data message, and sends each ML machines its data message. To do this, the data plane 120 has its TM 144 replicate the final data message (similar to the approach described above by reference to FIG. 2) and embeds the weight gradient sums in these replicated messages. In other embodiments, the data plane has its message generator 135 generate messages that are populated with the accumulated weight gradient sums.

Other embodiments implement these operations differently. For instance, some embodiments first generate the replicated message for each ML machine, then retrieve the fixed-point weight gradient sums and convert these sums to floating point formats. Also, in some embodiments, a data message from an ML machine has to be recirculated through the data plane one or more times to generate the weight gradient sums for each weight in order to support more ML machines and/or more weights in each data message, which would require more stages and resources than available to compute the sums in one pass through the data plane's ingress and egress pipelines.

Also, instead of the 43-bit implementation, other embodiments convert 16-bit floating points to 42-bit representations, and perform the aggregation with respect to the 42-bit representations. These embodiments use 11 bits for the normal values (i.e., 1 plus 10 bits for fraction). For the exponent 1, these embodiments do not need to do any shift as normal values get a bias of negative 15 in power while sub-normal values get a bias of negative 14. Thus, under this approach, exponent 1 has a 0 shift (to align with sub-normal values) and exponent 31 has a 30-bit shift. Accordingly, overall 42 bits are need for 1 sign bit, 30 bits for shifting, and 11 bits for the fraction (1plus 10 bit fraction). Some embodiments that use this approach use the lower 21-bit values of the 32-bit Y and Z containers.

Figure 15:
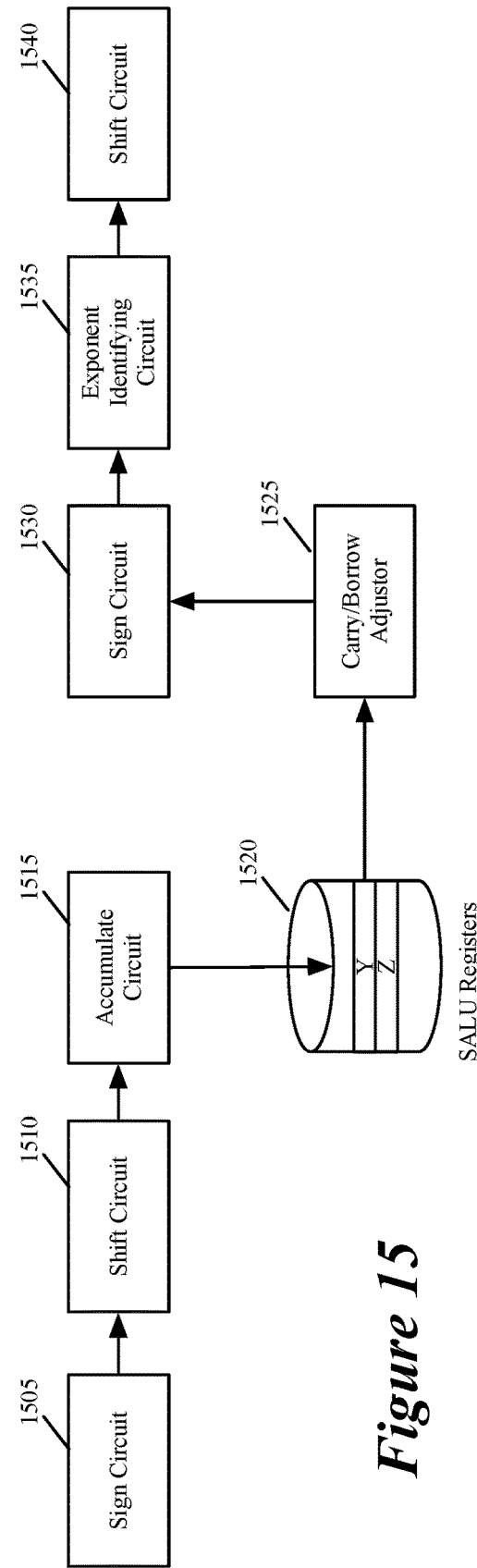
FIG. 15 illustrates the operations that some embodiments perform to convert a floating-point weight gradient $W_i$ to a fixed-point weight gradient, add the converted weight gradient to a total $S_i$ that is maintained for that gradient's associated weight, and to convert the fixed-point weight gradient sum to a floating-point weight gradient sum.

FIG. 15 illustrates the operations that some embodiments perform to convert a floating-point weight gradient Wi to a fixed-point weight gradient, add the converted weight gradient to a total Si that is maintained for that gradient's associated weight, and to convert the fixed-point weight gradient sum to a floating-point weight gradient sum. Each of these operations in some embodiments is performed by one or more MAU stages. These operations will be described below by reference to an example that converts a half-precision 16-bit floating point gradient into a 43-bit gradient that is stored in two containers Y and Z, which illustrated in the above-described FIG. 14.

As shown, the first operation is performed by a sign processing circuit 150 to account for the sign value in the half-precision floating point number. The pseudo code below describes the data plane configuration logic that the sign circuit 1505 implements. As shown, when the exponent is zero, the sign circuit initially sets both containers Y and Z (1) to negative X.f when the sign is negative and the exponent is zero, (2) to positive X.f when the sign is positive and the exponent is zero, (3) to 10000000000 minus X.f when the sign is negative and the exponent is not zero, and (4) to 10000000000 plus X.f when the sign is positive and the exponent is not zero.

```
if X.e==0: // subnormal
    if X.s==1: Y=Z=-X.f            //when value negative
    if X.s==0: Y=Z=X.f             //when value positive
else
    if X.s==1: Y=Z=-0x400 - X.f    //when value negative
    if X.s==0: Y=Z=0x400 + X.f     //when value positive
```

In some embodiments, one MAU stage implements the sign circuit 1505. This MAU stage uses a TCAM with the following records to identify the operations that the MAU stage's action ALU has to perform.

| TCAM Table | | | |
|---|---|---|---|
| Sign | Exponent | Fraction | Op Instruction |
| X | 0 | 0 | no op (zero) |
| + | 0 | X (any non-zero value) | copy fraction (positive subnormal) |
| − | 0 | X (any non-zero value) | copy fraction (negative subnormal) |
| + | X | X (any non-zero value) | add 0x400 (positive normal) |
| − | X | X (any non-zero value) | sub 0x400 (negative normal) |

In the above-table, X means do not care. One of ordinary skill will realize that the TCAM table does not specify an operation instruction but rather identifies directly or indirectly an instruction in the MAU's action instruction memory in some embodiments for the action ALU of this stage to perform. Without this TCAM, up to three exact match tables would be needed to implement the operation of the sign circuit 1505. In two's complement logic, a negative of a number two's complement number is produced by inverting each bit and adding 1 to the result. Also, in this logic, shifting a value by 1 to the left implements a multiply by two operation, while shifting a value by 1 to the right implements a divide by two operation.

After the sign circuit 1505 processes the gradient, a shift circuit 1510 performs shift operations on the Y and Z container values to account for the value of the exponent of the half-precision value. The pseudo code below describes the data plane configuration logic that the shift circuit 1510 implements. As shown, when the exponent is not zero, the shift circuit 150 shifts the bits in the Z container to the left by the exponent value (which is between 1-31 in this case) minus 1. Also, when the exponent value is greater than 23, the shift circuit 150 shifts the bits in the Y container to the left by the exponent value (which is between 24-31 in this case) minus 23, while when the exponent value is 23 or smaller, the shift circuit 150 shifts the bits in the Y container to the right by 23 minus the exponent value (which is between 1-23 in this case).

```
if X.e!=0:
    Z<<=(X.e − 1)
if X.e > 23
    Y<<=X.e−23
else:
    Y>>=23−X.e
```

In some embodiments, this shifting operation is performed by one or more action ALUs of one or more MAU stages based on the matching of the exponent values of the gradients to match table records. Also, as mentioned above, the containers Y and Z in some embodiments are two containers in the header vector of a processed data message. Hence, in these embodiments, the shift circuit 1510 stores the results of it shift operation(s) back in these containers Y and Z in the header vector.

After the shift circuit 1510 completes its shift operation for the weight gradient Wi and stores the result of this operation in containers Y and Z for this weight gradient in the header vector, the weight gradient has been converted into its 43-bit format stored in two 32-bit containers Y and Z. Accordingly, an accumulate circuit 1515 can then store or add this weight gradient to the SALU storage that stores the sum of all weight gradients Wi received from all of the ML machines.

In some embodiments, two SALUs of an MAU stage implement the accumulate circuit 1515, with each SALU storing or adding one container value Y or Z for a particular weight gradient Wi. When the data message being processed is the first data message in a group of data messages from the ML machines that provide a group of weight gradient sets, these two SALU registers extract the Y and Z 32-bit values from Y and Z containers in the header vector, and store these values in their Y and Z SALU registers. On the other hand, when the processed data message is not the first data message in the group, each SALU extract its corresponding Y or Z 32-bit value from the Y or Z container in the header vector, retrieves the value stored in its corresponding register Y and Z, and adds the extracted and retrieved values, and stores the result back into the Y or Z register.

Some embodiments pipeline the accumulate-side operations of the circuits 1505-1510 in order to maximize the number of weight gradients that can be converted to fixed point and accumulated in each pass through the data plane 120. Even with this pipelining, the data plane in some embodiments might not be able to process all the weight gradients in one pass through an ingress pipeline and an egress pipeline. In these embodiments, the processed data message is recirculated from the egress pipeline back to an ingress pipeline one or more times to complete the processing and accumulation of all of the weight gradients.

Some embodiments further reduce the accumulate-side processing of the data plane by assuming that the weight gradients are going be within a small numerical range (e.g., −2 to 2). Based on this assumption, these embodiments convert each 16-bit half-precision floating point number to a smaller number of bits (e.g., 27 bits) that fit within one 32-bit container. This approach requires less data-plane resources for converting, accumulating, and storing the numbers, which, in turn, frees up for data-plane resources for processing more weight gradients during each pass through the data plane.

Once all the ML machines have provided their weight gradient sets for a group of weights, the weight gradient sums can be read from the SALU registers 1520 and converted back to floating point formats before being embedded in data message and transmitted to the ML machines. For one weight gradient sum Si, this conversion starts with a carry/borrow adjustor 1525. This adjustor extracts the Y and Z container values associated with this sum from the SALU registers 1520 and modifies the value of the upper container Y based on the value of the lower container Z to account for needed carry or borrow operations that need to be performed before combining the values contained in these two containers.

Specifically, as specified by the pseudo code below, the carry/borrow adjustor initially computes a t value based on whether the lower Z container is negative or not. The lower container Z should only have 22 bits, but adding different numbers may make it have a carry when Z is positive and a borrow when Z is negative. The carry and borrow bits are the 10 MSBs of the container Z. The carry/borrow bits are saved in the variable called t. When Z is negative, t also has to be negative. This is why t is concatenated (merged) with 22 bits of 1 (0xFFFFF3) when Z is negative; otherwise, t is a concatenation of 0 and the 10 MSBs of the Z container.

```
if Z<0: t=concat[0xFFFFF3, Z[31:22]]
    else: t=concat[0, Z[31:22]]
Y+=t
Z=<<10
```

The carry/borrow adjustor also shifts Z to the left by 10 bits in order to ensure that data portion of the Z container is positioned to the left of this container's left. As mentioned above, some embodiments uses one or more action ALUs of one or more MAU stages to perform a shift operation. The carry/borrow adjustor 1525 writes the adjusted values of Y and Z into two containers of a data message being processed to retrieve a sum weight gradient.

After dealing with the carry/borrow adjustment, a sign circuit 1530 examines the values of containers Y and Z in the header vector and based on these values performs operations to account for possible negative value for Y. The pseudo code below conceptually describes the operations of the sign circuit 1530 in some embodiments. As listed, if Y is determined to be a negative number, then X.s (i.e., the sign value in the half-precision floating point expression) is set to 1; this value is initially set to 0 and X.s retains this value when Y is determined not to be negative. Also, if Y is negative and Z is not zero, Y is set to not Y and Z is set to negative Z plus 10000000000.

```
if Y<0:
    X.s=1
    if Z==0: Y=−Y
    else: Y=not Y; Z=−Z+0x400
```

If Y is negative after adding carry/borrow, the sign bit has to be set and the number has to be made positive. As mentioned above, making a number positive in two's complement calculation means inverting each value of that number and adding 1. To make Z and Y positive, Y has to be set to not Y and Z has to be set to not Z+0x400. (Remember Z was shifted 10 bits so 1 is 0x400). However, it is hard to compute not Z+0x400 in hardware. Hence, some embodiments compute Z to be not Z+1+0x3ff which can be simplified to −Z+0x3ff. There is one special case, if Z is 0 then not Z+0x400 will have a carry. In this case Z should remain 0 but Y should be not Y+1, which is essentially −Y. Accordingly, the pseudo code that describes the operation of the sign circuit in some embodiments can be expressed as:

```
if Y<0:
    X.s=1
    if Z!=0: Y=not Y; Z=−Z+0x3FF
    else: Y=−Y
```

Once the sign examining operations have been completed, an exponent identifying circuit 1535 identifies the leftmost 1 value in the concatenation of Y and Z is identified, and uses this value to set X.e (i.e., the exponent value in the half-precision floating point expression). This leftmost 1 value identifies the location in the concatenation of Y and Z that identifies a start of fraction bits (X.f) associated with a floating point value corresponding to the fixed point value. For instance, in some embodiments, the bit after the leftmost 1 is the start of the fraction bits (X.f). Some embodiments do not check whether the leftmost bit is in the rightmost 9 bits as this would be the case for a sub-normal value.

The pseudo code below expresses the operation of the exponent identifying circuit 1535 in some embodiments. As shown in the pseudo code below, the concatenation is the 32 bits of the Y container plus the top 22 bits of the Z container.
m=index of leftmost 1 in concat(Y,Z[31:10])
X.e=max(m−9,0)
To identify the leftmost 1 value in the concatenation of Y and Z, some embodiments use a TCAM match table of an MAU stage. In some embodiments, a TCAM match table identifies the leftmost 1 value in a received n-bit value by storing n-records, each of which stores an n-bit value with a single valid bit that is set to 1 and all other bits as 0s or don't cares. The records are stored in the TCAM in an order with the larger n-bit values (i.e., with the leftmost valid 1 values) in earlier TCAM locations. The TCAM in these embodiments compares the received n-bit values with all the stored n-bit values concurrently.

When multiple stored n-bit values match a received value, the TCAM in these embodiments selects the stored n-bit value with the leftmost valid 1 bit that matches a 1 bit in the received value. Specifically, in comparing the received n-bit value with each stored n-bit value, the TCAM in some embodiments only compares the single valid 1 value in the stored n-bit value with the corresponding bit in the received value to determine whether the two n-bit values match. When the received value matches at least one n-bit value (i.e., when the received value has a 1 that matches a 1 value in a corresponding bit of a stored n-bit value), the TCAM outputs in some embodiments a value that identifies the location of the matching valid 1 value in a matching n-bit value with the leftmost valid 1 bit. In some embodiments, the value that the TCAM outputs specifies the leftmost bit in the received n-bit value. In other embodiments, the leftmost bit in the received n-bit value is derived from the value output from the TCAM. Some embodiments do not check whether the leftmost bit is in the rightmost 9 bits as this would be the case for a sub-normal value.

In other embodiments, the TCAM operates differently. For instance, in some embodiments, the TCAM concurrently compares each received n-bit value with multiple bits in each of its records, with each of its multi-bit records having 0, 1 or don't care (x) values for each of its bits and only at most one of these bits being a 1 value. In these embodiments, only one record with a valid 1 bit would identify the leftmost 1 bit in a received value. For instance, for a 4-bit example, the TCAM records would be 0000, 0001, 001x, 01xx, 1xxx, and xxxx. When the received value is 0110, the TCAM would match the received value with its fourth record (01xx) and would that the leftmost 1 bit is the third bit from the right. On the other hand, when the received value is 0011, the TCAM would match the received value with its third record (001x) and would that the leftmost 1 bit is the second bit from the right.

After setting X.e, a shift circuit 1540 shifts the concatenation of Y and Z to the left by the max of 10 and X.e+10. As mentioned above, some embodiments uses one or more action ALUs of one or more MAU stages to perform a shift operation. The shift circuit then defines X.f to be the lower 10 bits of Z, by AND'ng Z with 0x3ff (which is 001111111111). The pseudo code below expresses the operation of the shift circuit 1540 in some embodiments.
Z=concat(Y,Z)>>max(10,X.e+10)
X.f=Z & 0x3FF While the invention has been described with reference to numerous specific details, one of ordinary skill in the art will recognize that the invention can be embodied in other specific forms without departing from the spirit of the invention. For instance, other embodiments use other approaches to convert floating point numbers to fixed point numbers and/or to convert fixed point numbers to floating point numbers. In some embodiments, the floating-point weight gradients that are added are truncated to be between −2 and 2. As such, the half-precision floating point exponent in these embodiments can have 1 of 16 values (e.g., between 0 to 15), and only 27 bits are needed for a fixed point conversion of a floating point weight gradient (as f can be shifted up to 15 bits to left, f can be 10 bits, plus an extra 1 bit and another bit for sign), as mentioned above.

In these embodiments, the 27-bit fixed point value is stored in a 32-bit container, which leaves five extra bits that can be used to store carry bits that result from adding multiple fixed point values. To perform the 16-bit floating point conversion to a 32-bit fixed point representation, some embodiments use a look up table (LUT) that stores a single 32-bit converted fixed point value for each possible 16-bit half precision floating point value. This LUT is a match table of an MAU stage in some embodiments that for each 16-bit half precision floating point value outputs its corresponding 32-bit fixed-point value.

To convert a 32-bit fixed-point value that represents a sum of weight gradients (that were converted from 16-bit floating point representations to 32-bit fixed-point representations), the MAUs of some embodiments implement the logic reflected by the following pseudo-code. In this pseudo code, Y is the 32-bit container that store the 32-bit sum of several 32-bit converted fixed-point weight gradients.

```
If Y<0,
    Then X.s=1
    Y=−Y
m = index of leftmost 1 in Y
If m<10 / sub-normal case/
    X.e=0
Else /normal case/
    X.e=m−9
    Y shifted to right by X.e−1
X.f = Y AND'd with 0x3FF /mask operation/
```

To implement this logic, one or more MAU stages perform the sign operations that when Y is negative, set the X.s to 1 and invert Y. Another MAU stage then identifies the location of the leftmost 1 value in Y. As mentioned above, this leftmost 1 value identifies the location in the concatenation of Y and Z that identifies a start of fraction bits (X.f) associated with a floating point value corresponding to the fixed point value. As further discussed above, some embodiments identify the location m of the leftmost 1 by using a TCAM for the match table of the MAU stage, where this TCAM outputs a value that identifies the leftmost bit in Y. When m is less than 9, the Y value is associated with the sub-normal case. Hence, an MAU stage sets X.e to zero and the Y is not shifted.

On the other hand, when m is equal or larger than 9, one or more MAU stages sets X.e to m−9, and shift Y to the right by X.e minus 1. As mentioned above, the action ALUs of one or more MAU stages in some embodiments are used to shift bits of a multi-bit value to the right or left by a specified amount. Lastly, an MAU stage performs a masking operation that sets X.f equal to the result of AND'ing Y and 0x3FF (i.e., sets X.f equal to the lower 10 bits of Y). Accordingly, one of ordinary skill in the art would understand that the invention is not to be limited by the foregoing illustrative details, but rather is to be defined by the appended claims.

The invention claimed is:

1. A data plane circuit for a forwarding element that forwards data messages, the data plane circuit comprising:
   a plurality of programmable message-processing stages to perform data message processing operations on data tuples associated with data messages received by the data plane circuit in order to forward the data messages to at least one machine;
   a parameter extracting circuit to extract, from a subset of the data messages, parameter values computed and distributed by a first set of machines;
   a set of one or more storages, wherein the parameter extracting circuit is configured to store the extracted parameter values the set of one or more storages; and
   a parameter forwarding circuit to retrieve the stored extracted parameter values and to forward the retrieved extracted parameter values to a second set of machines.

2. The data plane circuit of claim 1, wherein the first and second set of machines are the same set of machines.

3. The data plane circuit of claim 1, wherein one set of machines has at least one machine that is not in the other set of machines.

4. The data plane circuit of claim 1, wherein the parameter forwarding circuit is to retrieve the stored parameter values after the parameter values distributed by all of the machines in the first set of machines are stored in the set of one or more storages.

5. The data plane circuit of claim 4, wherein the parameter forwarding circuit comprises a data message generator to generate a plurality of data messages to include the retrieved parameter values to provide to different machines in the second set of machines.

6. The data plane circuit of claim 5, wherein the data message generator is to generate data messages by replication of a last data message that provides a last set of one or more parameter values to complete a group of parameter values collected from the first set of machines.

7. The data plane circuit of claim 6 further comprising:
   a plurality of ingress message-processing pipelines, wherein at least one ingress message-processing pipeline comprises a plurality of programmable message-processing stages;
   a plurality of egress message-processing pipelines, wherein at least one egress message-processing pipeline comprises a plurality of programmable message-processing stages; and
   a traffic manager to forward data messages between ingress pipelines and egress pipelines, the traffic manager to implement the data message generator and replicate the last data message.

8. The data plane circuit of claim 1 further comprising:
   a plurality of ingress message-processing pipelines, wherein at least one ingress message-processing pipeline comprises a plurality of programmable message-processing stages;
   a plurality of egress message-processing pipelines, wherein at least one egress message-processing pipeline comprises a plurality of programmable message-processing stages; and
   a traffic manager to forward data messages between ingress pipelines and egress pipelines, the traffic manager comprising a mirror buffer that includes the set of one or more storages to store the parameter values contained in the data messages sent by the first set of machines, wherein the stored parameter values are retrieved from the mirror buffer before being provided in a plurality of data messages that are sent to the second set of machines.

9. The data plane circuit of claim 1, wherein
   at least a set of programmable message-processing stages comprises stateful processing units, and
   the set of one or more storages comprise stateful storages of the stateful processing units.

10. The data plane circuit of claim 9 further comprising:
    a plurality of ingress message-processing pipelines, wherein at least one ingress message-processing pipeline comprises a plurality of programmable message-processing stages;
    a plurality of egress message-processing pipelines, wherein at least one egress message-processing pipeline comprises a plurality of programmable message-processing stages;
    wherein stateful processing units that store the parameter values in their stateful storages are part of at least a set of egress message-processing pipelines.

11. A non-transitory machine readable medium storing a program for configuring a data plane circuit for a forwarding element that forwards data messages to at least one machine, the program for execution by at least one processing unit, the program comprising sets of instructions for:
    configuring a plurality of programmable message-processing stages to process data tuples associated with data messages received by the data plane circuit in order to forward the data messages to at least one machine;
    configuring a parameter extracting circuit to extract, from a subset of the data messages, parameter values computed and distributed by a first set of machines;
    configuring a set of one or more storages in which the parameter extracting circuit stores the extracted parameter values; and
    configuring a parameter forwarding circuit to retrieve the stored parameter values and to forward the retrieved parameter values to a second set of machines.

12. The non-transitory machine readable medium of claim 11, wherein
    the plurality of programmable message-processing stages comprises a first set of programmable message-processing stages of the data plane circuit, and the sets of instructions for configuring the parameter extracting circuit, the set of one or more storages and the parameter forwarding circuit comprises sets of instructions for configuring a second set of programmable message-processing stages of the data plane circuit to implement the parameter extracting circuit, the set of one or more storages and the parameter forwarding circuit.

13. The non-transitory machine readable medium of claim 12, wherein the message-processing stages of the first and second sets of programmable message-processing stages comprise match-action circuits that attempt to match attribute sets associated with the data messages to records in match tables and perform actions associated with match table records that match attribute sets of the data messages.

14. The non-transitory machine readable medium of claim 12, wherein at least a subset of programmable message-processing stages comprise stateful processing units, and the set of one or more storages comprise stateful storages of the stateful processing units.

15. The non-transitory machine readable medium of claim 11, wherein the set of instructions for configuring the parameter forwarding circuit comprises a set of instructions for configuring the parameter forwarding circuit to retrieve the stored parameter values after the parameter values distributed by all of the machines in the first set of machines are stored in the set of one or more storages.

16. The non-transitory machine readable medium of claim 15, wherein the set of instructions for configuring the parameter forwarding circuit further comprises a set of instructions for configuring a data message generator to generate a plurality of data messages to include the retrieved parameter values to provide to different machines in the second set of machines.

17. The non-transitory machine readable medium of claim 16, wherein the set of instructions for configuring the data message generator comprises a set of instructions for replicating a last data message that provides a last set of one or more parameter values to complete a group of parameter values collected from the first set of machines.

18. The non-transitory machine readable medium of claim 11, wherein
at least one machine in the first set of machines distributes a set of a plurality of parameter values,
at least one parameter value in a machine's distributed parameter-value set has an associated parameter value in another parameter value set distributed by another machine in the first set of machines,
the parameter extracting circuit stores in an interleaved manner the parameter values distributed by the first set of machines in order to allow the parameter forwarding circuit to conjunctively collect as sets of associated parameter values the associated parameter values from different parameter-value sets distributed by different machines, and
the parameter forwarding circuit providing each set of associated parameter values from different distributed parameter-value sets to the second set of machines in order to alleviate the second set of machines from having to parse the parameter values to collect each set of associated parameter values.

19. The non-transitory machine readable medium of claim 11, wherein
a set of storage locations comprise stateful storage locations of a set of message processing stages of the data plane circuit, and
the parameter extracting circuit storing at least two different parameter values of at least one parameter value set in at least two different storage locations of two different message processing stages.

20. The non-transitory machine readable medium of claim 19, wherein
the parameter extracting circuit uses a first storage pattern to store the parameter values of at least a first parameter value set from a first machine and a second, rotated storage pattern to store the parameter values of at least a second parameter value set from a second machine, the rotated storage pattern for reading of associated sets of parameter values from the storage locations.

21. A method comprising:
processing, using a plurality of programmable message-processing stages, data tuples associated with data messages received by the data plane circuit in order to forward the data messages to at least one machine;
extracting, from a subset of the data messages, parameter values computed and distributed by a first set of machines;
storing the extracted parameter values; and
retrieving the stored parameter values and forwarding the retrieved parameter values to a second set of machines.

22. The method of claim 21, wherein
the plurality of programmable message-processing stages comprises a first set of programmable message-processing stages and a second set of programmable message-processing stages.

23. The method of claim 21, wherein
the message-processing stages of the first and second sets of programmable message-processing stages comprise match-action circuits that attempt to match attribute sets associated with the data messages to records in match tables and perform actions associated with match table records that match attribute sets of the data messages.

24. The method of claim 21, comprising:
generating a plurality of data messages to include the retrieved parameter values to provide to different machines in the second set of machines.

25. The method of claim 21, comprising:
generating data messages by replication of a last data message that provides a last set of one or more parameter values to complete a group of parameter values collected from the first set of machines.

* * * * *